US012790250B2

(12) United States Patent
Merrell

(10) Patent No.: US 12,790,250 B2
(45) **Date of Patent: *Nov. 10, 2026**

(54) SYSTEM AND PROCESS FOR REDUCING PFAS AND MICROPLASTICS IN BIOSOLIDS USING HYDRODYNAMIC CAVITATION AND FOAM FRACTIONATION

(71) Applicant: Merrell Bros., Inc., Kokomo, IN (US)

(72) Inventor: Terry Merrell, Kokomo, IN (US)

(73) Assignee: MB Holding Company, Inc., Kokomo, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/333,881

(22) Filed: Sep. 19, 2025

(65) Prior Publication Data

US 2026/0070854 A1 Mar. 12, 2026

Related U.S. Application Data

(63) Continuation of application No. 19/055,052, filed on Feb. 17, 2025, now Pat. No. 12,459,846, and a (Continued)

(51) Int. Cl.

*C02F 11/12* (2019.01)
*C02F 1/24* (2023.01)

(Continued)

(52) U.S. Cl.

CPC ................ *C02F 11/12* (2013.01); *C02F 1/24* (2013.01); *C02F 11/004* (2013.01); *C02F 11/121* (2013.01); *C02F 11/122* (2013.01); *C02F 11/125* (2013.01); *C02F 11/127* (2013.01); *C05F 3/00* (2013.01); *C05F 17/10* (2020.01); *C05F 17/70* (2020.01); *C05F 17/80* (2020.01); *C05F 17/90* (2020.01); *C05F 17/921* (2020.01); *C05F 17/929* (2020.01); *C05F 17/95* (2020.01);

(Continued)

(58) Field of Classification Search

CPC .......... C02F 1/24; C02F 11/004; C02F 11/12; C02F 11/121; C02F 11/122; C02F 11/125; C02F 11/127; C02F 2101/36; C02F 2303/26; C02F 2305/04; C05F 3/00; C05F 17/10; C05F 17/70; C05F 17/80; C05F 17/90; C05F 17/921; C05F 17/929; C05F 17/95; C05F 17/957; C05F 17/971; C05F 17/993

See application file for complete search history.

(56) References Cited

U.S. PATENT DOCUMENTS

2016/0054031 A1 2/2016 Echart

FOREIGN PATENT DOCUMENTS

CN 205501082 8/2016

*Primary Examiner* — John Kim

(74) *Attorney, Agent, or Firm* — FisherBroyles, LLP

(57) ABSTRACT

A method for reducing particles from biosolids, comprising a storage tank for holding biosolids and an inlet pipe. The inlet pipe delivers biosolids from the storage tank to a screener and then to a percent solids meter. The percent solids meter measures the solid content in the biosolids and sends a signal to an electronic solenoid valve to control water content of the biosolids introduced to the system. A first venturi hydrodynamic cavitation to create vacuum bubbles in the biosolids. A mechanical hydrodynamic cavitation device operably connected to first venturi hydrodynamic cavitation, wherein the mechanical hydrodynamic cavitation device creates vacuum bubbles in the biosolids.

16 Claims, 26 Drawing Sheets

Related U.S. Application Data continuation of application No. 18/651,805, filed on May 1, 2024, now Pat. No. 12,291,492.

(51) Int. Cl.

| | |
|---|---|
| ***C02F 11/00*** | (2006.01) |
| ***C02F 11/121*** | (2019.01) |
| ***C02F 11/122*** | (2019.01) |
| ***C02F 11/125*** | (2019.01) |
| ***C02F 11/127*** | (2019.01) |
| ***C05F 3/00*** | (2006.01) |
| ***C05F 17/10*** | (2020.01) |
| ***C05F 17/70*** | (2020.01) |
| ***C05F 17/80*** | (2020.01) |
| ***C05F 17/90*** | (2020.01) |
| ***C05F 17/921*** | (2020.01) |
| ***C05F 17/929*** | (2020.01) |
| ***C05F 17/95*** | (2020.01) |
| ***C05F 17/957*** | (2020.01) |
| ***C05F 17/971*** | (2020.01) |
| ***C05F 17/993*** | (2020.01) |
| *C02F 101/36* | (2006.01) |

(52) U.S. Cl.

CPC .......... *C05F 17/957* (2020.01); *C05F 17/971* (2020.01); *C05F 17/993* (2020.01); *C02F 2101/36* (2013.01); *C02F 2303/26* (2013.01); *C02F 2305/04* (2013.01)

SYSTEM AND PROCESS FOR REDUCING PFAS AND MICROPLASTICS IN BIOSOLIDS USING HYDRODYNAMIC CAVITATION AND FOAM FRACTIONATION

This application is a continuation of application Ser. No. 19/055,052 filed on Feb. 17, 2025, now U.S. Pat. No. 12,459,846, and a continuation-in-part of application Ser. No. 18/651,805 filed on May 1, 2024, now U.S. Pat. No. 12,291,492. This application includes amendments to the specification to correct informalities and the Replacement Drawings in application Ser. No. 18/651,805 as filed on Feb. 7, 2025. No new matter has been added.

BACKGROUND OF THE INVENTION

Biosolids comprise solid, semi-solid, or liquid residue generated during biological wastewater treatment process. This application discloses and claims improvements to systems and methods for converting biosolids to class A fertilizer as disclosed and claimed in U.S. Pat. Nos. 9,751,813 and 10,259,755 and published applications US20230257320 A1, 20230174403 A1, and 20220315500 A1.

Biosolids are known to contain polyfluoroalkyl substances ("PFAS") including without limitation, Perfluoro octane Sulfonate or Perfluoro octane Sulfonic Acid ("PFOS"), Perfluorooctanoic acid ("PFOA"), and other PFAS compounds. At high levels, PFAS can create environmental or health problems. Currently no systems or methods exist for economically or efficiently reducing or removing PFAS or microplastic levels in biosolids. The few technologies that do exist result in the substantial destruction of the nutrient contents of biosolids. Concerns about increased, tipping fees, and rising costs associated with meeting any new PFAS regulations have resulted in cities and municipalities seeking alternate and more efficient methods to destroy or remove PFAS and microplastics from biosolids in order to meet upcoming future regulations.

The improvements disclosed and claimed herein comprise using hydrodynamic cavitation, size reduction and foam fractionation technology for removing PFAS compounds and microplastic particles from biosolids. Since landfills are considered to be a large generator of PFAS in their leachate, foam fractionation technology has been limited to drinking water and leachate. Current foam fractionation technology ("FF") for drinking water and leachate requires screening and filtering of the material to remove solids. Without screening and filtering, solids in these systems plug the polishing phase and cause fouling. The limitations in existing FF in handling solids have impeded further technological development on waste streams with high solid content.

Biosolids are nutrient rich and have a high fertilizer volume. Systems and methods for removing PFAS and microplastic particles from biosolids are needed to encouraging the recycling of biosolids as a Class A fertilizer instead of sending biosolids to landfills. Supercritical water oxidation is one technology that destroys PFAS and converts it into water, however, supercritical water oxidation also destroys the valuable fertilizer nutrients in biosolids. For the purpose of this disclosure, reference is made to PFAS, but the same inventive applications work to remove microplastic particles.

The inventions disclosed and claimed herein teach the ability to destroy or concentrate and remove PFAS, including without limitation, PFOS, PFOA, other PFAS compounds, and microplastic particles. The disclosed inventions allow for the destruction, concentration, or removal of PFOS, PFOA, and other PFAS compounds from the biosolids. One benefit of the inventions disclosed includes removing these PFAS compounds while maintaining the valuable nutrient content in biosolids. The systems and methods disclosed and claimed herein include the use of FF to remove PFAS and microplastic particles from the biosolids mixture as part of the conversion of biosolids to Class A fertilizer.

Biosolids are typically much thicker than what existing FF systems can process. Biosolids have particle sizes that can insulate or protect some PFAS particles and not allow them to be removed to acceptable levels using FF alone. The disclosed inventions use a shearing, hydrodynamic cavitation, screening, and disintegration method to reduce biosolids into particle sizes that are small enough to release hydrophobic PFAS particles using FF.

Even after reducing the size of the biosolids, such biosolids cannot be processed using existing FF technologies because biosolids thicker than about 1% solids will not permit sufficient air bubble flow to remove PFAS. The present inventions solve this problem by using a percent-solids meter to continuously monitor the percent solids of the incoming biosolids. The percent-solids meter can originate a signal to an operably connected water valve so that the system can add water to dilute the biosolids continuously to about 1% solids thickness. Once diluted, the biosolids can be processed using FF to remove PFAS and microplastic particles.

SUMMARY OF THE INVENTION

The systems and processes of the claimed invention combine pre-screening, solids disintegration, hydrodynamic cavitation, water dilution, mixing, chemical addition of a surfactant if needed, injection of air bubbles, air removal and replacement, foam harvesting, foam concentration, repeating the fractionation process, and concentrating the foam to desired levels before removing. The disclosed systems and processes solve the problems of PFAS and microplastics removal without destroying the biosolids valuable nutrients. The disclosed systems and methods provide an economical solution that will increase compliance with possible future EPA regulations.

This invention also solves air quality issues related to the FF process. PFAS compounds can be released in small amounts into the air. Consequently, through the FF process, consisting of injecting volumes of air into the fractionation chamber, that air becomes dirtier and potentially more concentrated as it is recycled through the process. This invention involves a unique adjustable check valve vacuum system that introduces fresh air into the chambers while at the same time exhausting older, dirtier air out of the system. The exhausted dirtier air is then piped through a carbon air scrubber that captures any potential PFAS compounds in the released dirty air.

The disclosed systems and methods use a continuous operating system. Existing technologies use continuous batch systems. The continuous batch systems use multiple tanks. One tank is filled with material containing biosolids with PFAS and processed using FF. Current technology does not contemplate treating biosolids with the process described herein. While the biosolids in the first tank undergo FF, a second tank is filled with material containing biosolids with PFAS. By the time the second tank is filled, the processing in the first tank is complete, and the FF process repeats in the second tank. The disclosed inventions use a unique Weir tank design to allow a continuous flowing system and to increase the detention time that the biosolids are processed with FF. This reduces the need for multiple valves opening and closing, resulting in less maintenance, ease of automatic operations, and down time of the system.

Existing FF systems use a venturi pump system to suck the biosolids out of the bottom of the tank and then inject the biosolids back into the side of the tank through a venturi. A venturi pulls air into the line as air passes through the pump. The existing systems must have a second system that creates a vacuum to suck the foam off the top of the biosolids in the tank. The systems and methods disclosed herein are novel as they use a combined pressure/vacuum blower. Due to the novel design, the disclosed system uses the same pump to create the pressure and to create the vacuum. The disclosed systems use a unique velocity slowing chamber and demister to slow the flow of air to allow the bubbles to burst and turn back to water and fall down into the concentrate chamber, thereby reducing the volume of moisture and contaminants from the air stream.

Most biosolids from wastewater treatment plants comprise a slurry. At wastewater treatment plants, the wastewater enters the plant, is screened, and diverted to a biological aeration system. In these aeration systems, organisms are fed oxygen and food in the form of sludge or other organisms. Once the waste has undergone biological treatment, it is normally sent to a clarifier. The waste enters the clarifier substantially in the center of the clarifier and migrates to the edges of the clarifier. Once the waste gets to the edges, the water is clear and gets polished and sent to a river or stream. FIG. 8 shows what happens under the water in the bottom of the clarifier. The solids settle on the bottom of the clarifier, a scraper moves the solids to the center for the floor of the clarifier where a pump is positioned. The pump removes the solids from the clarifier.

The clear water overflows off the top. The water then proceeds to the final stage of disinfection and is ultimately discharged into a nearby receiving river or stream. Any solids remaining in the clarifier settle to the bottom of the clarifier. A rake on the bottom of the clarifier rotates to continuously rake the solids to the center of the clarifier floor. A pump is used to remove the solids from the clarifier. This sludge is moved to one of two places. A portion of the sludge feeds back to the original aeration basin as a source of food for the organisms so continued biological activity occurs. The sludge not needed in the clarifier is known as Waste Activated Sludge ("WAS") that must be disposed. Typically, WAS has been sent to digesters that continue to treat the WAS until it becomes what is called a biosolid that is disposed of through various known methods.

DESCRIPTION OF ILLUSTRATIVE EMBODIMENTS

Figure 25:
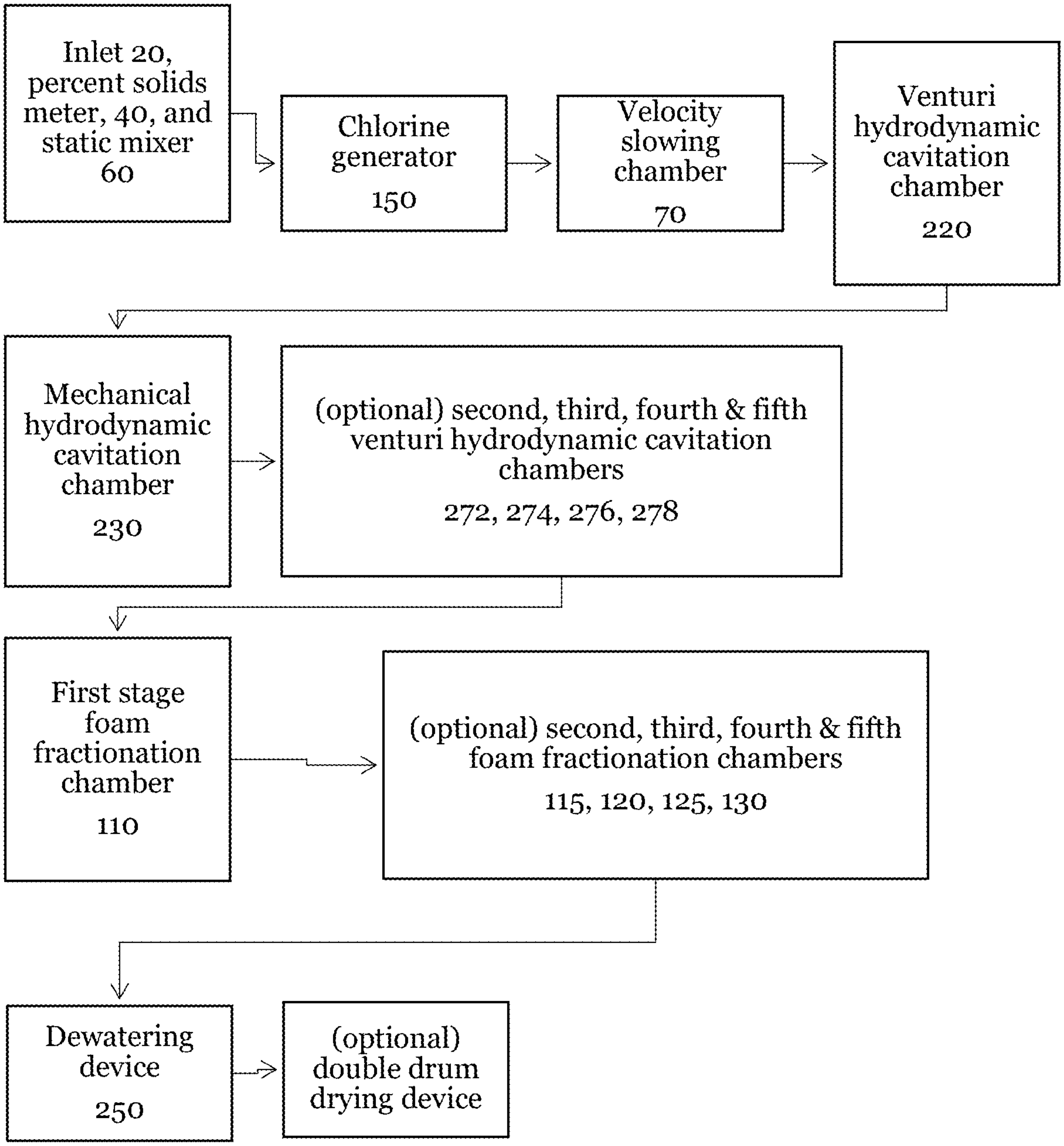
FIG. 25 shows a flowchart showing the primary steps in the treatment process.

This description provides contemplated modes of carrying out embodiments of the invention. The description illustrates the general principles of the claimed inventions without limiting their scope. Referring to FIG. 25, biosolids 30 enter system 10 through inlet 20. Percent solids meter 40 determines if biosolids 30 have an appropriate moisture content, and, if not, static mixer 60 adds water to biosolids 30. Biosolids then pass through chlorine generator 150 to velocity slowing chamber 70. After that, biosolids 30 proceed to venturi hydrodynamic cavitation chamber 220 and then to mechanical hydrodynamic cavitation chamber 230. Optionally, biosolids 30 may then proceed through second, third, fourth, and fifth venturi hydrodynamic cavitation chambers 272, 274, 276, 278. Biosolids 30 are then processed in one or more foam fractionation chambers 110(*n*) before proceeding to dewatering device 250 and, optionally, drying device.

The WAS solids concentration typically ranges from 1-2% solids (98-99% moisture). Prior limitations to FF of biosolids included plugging or clogging issues related to the high solids content of WAS. The continuous flow percent solids meter 40 measures the solids content of WAS. Through repeated testing, it was determined that biosolids 50 which have been diluted to the level of 1% solids and disintegrated can be subjected to FF for successful PFAS removal. Using the novel components and Programmable Logic Controls (PLC), the disclosed systems perform a method that continuously sends a reading of the percent solids to the electronic solenoid valve 30 that controls the flow of water into biosolids 50 to dilute the biosolids and to maintain the biosolids at about 1% solids, which in turn permits the continuous treatment as herein described. This invention controls the solid content of the biosolids 50 continuously to about 1% so that biosolids 50 can be effectively treated with hydrodynamic cavitation and FF to remove PFAS and microplastics to a desired concentration or level.

Figure 1:
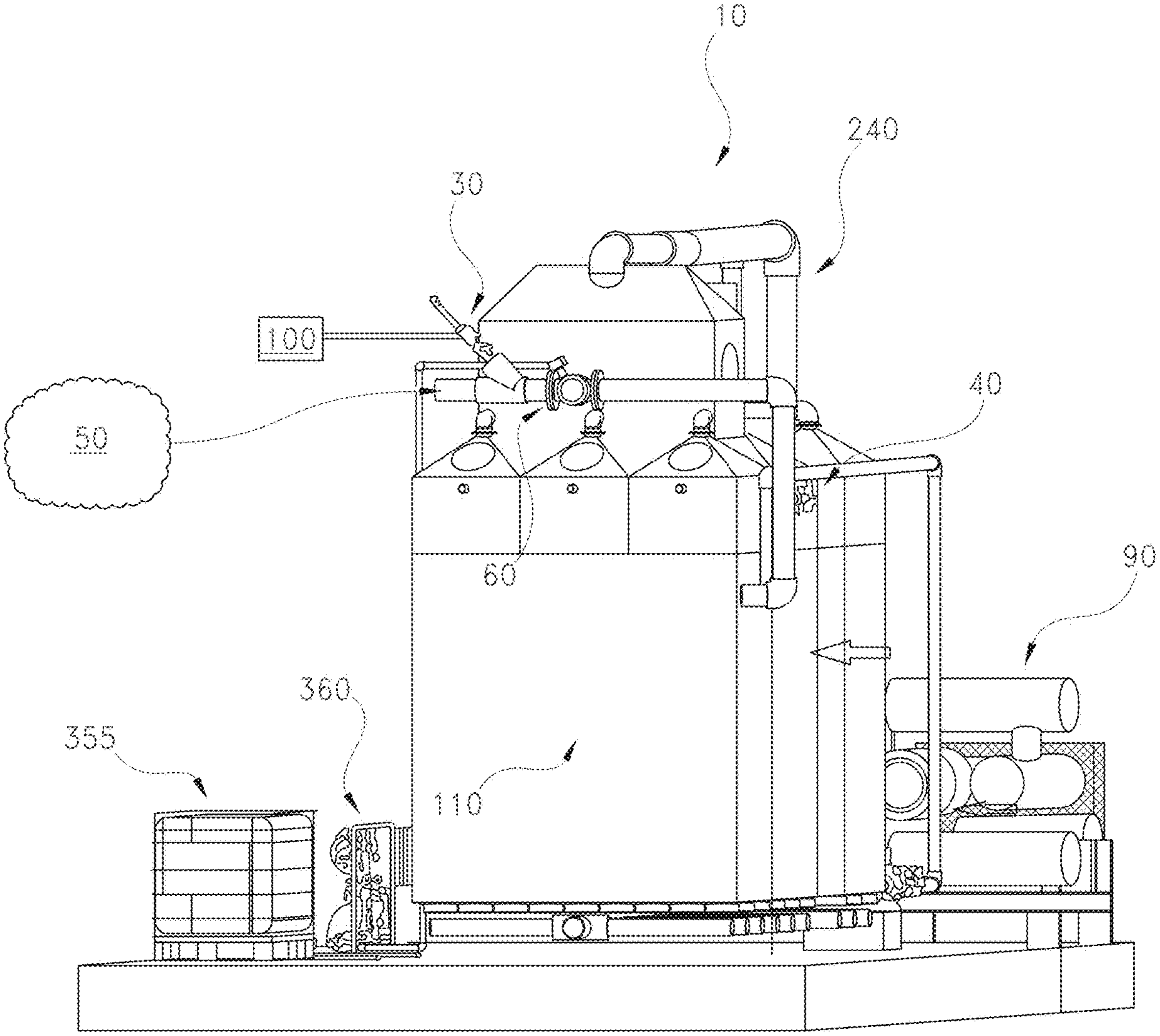
FIG. 1 shows a front perspective view of a foam fractionation system for treating biosolids.
Figure 2:
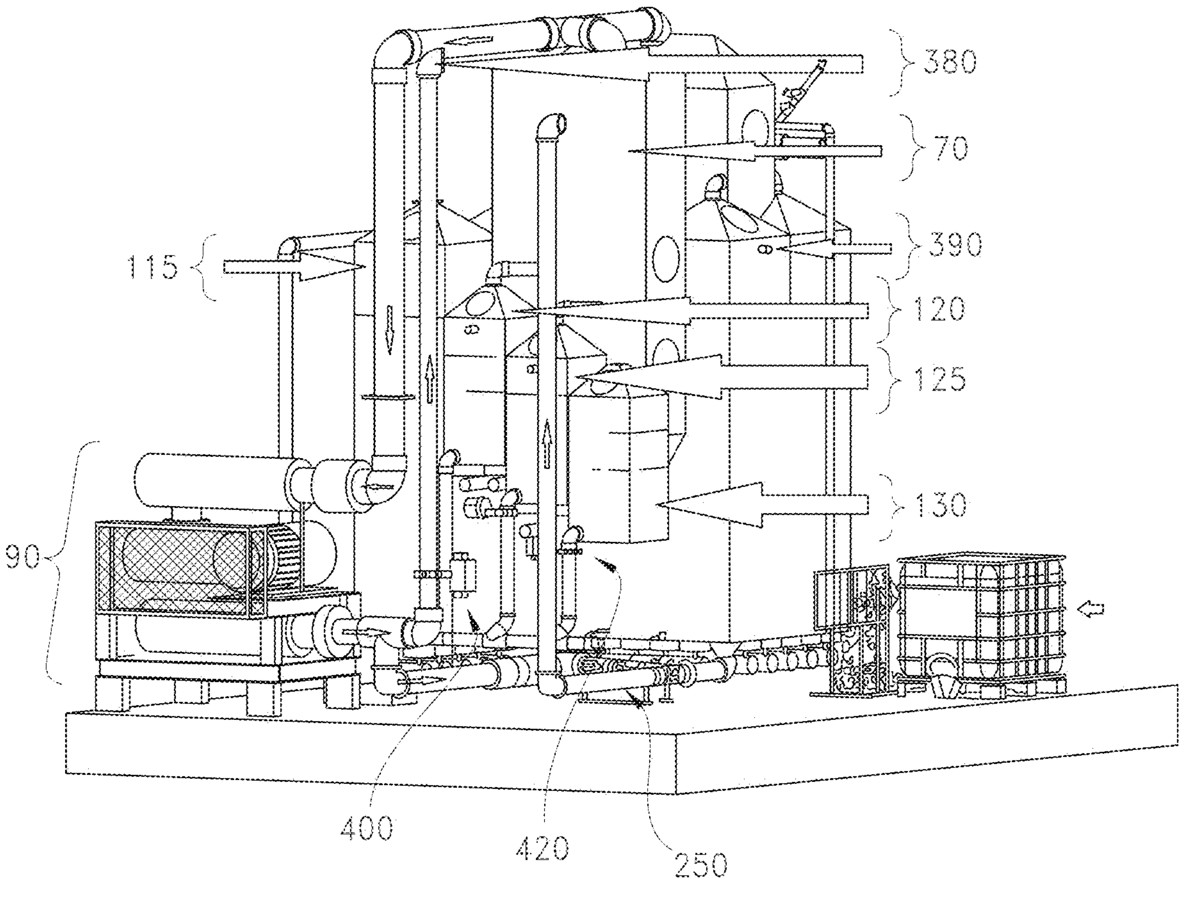
FIG. 2 shows a rear perspective view of a foam fractionation system for treating biosolids.

Referring to FIG. 1, the system 10 comprises multiple components. Biosolids 50 enter the system 10 through inlet pipe 20. A first valve 30 receives a signal from a continuous flow percent solids meter 40 to control the addition of water to biosolids 50 at a static mixer 60. In one embodiment, valve 30 is an electronic solenoid valve. Biosolids 50 enter a first stage foam fractionation chamber 110. In a preferred embodiment, the system 10 comprises a plurality of foam fractionation chambers 110, 115, 120, 125, and 130. Fractionation chambers 110, 115, 120, 125, and 130 may be constructed from metals, alloys, other suitable materials, or any combination of the foregoing. This specification uses (n) in connection with fractionation chambers 110 to denote that any plurality of chambers 110(*n*) may be used in the disclosed inventions. Fractionation chambers 110(*n*) may be of any useful size. In one embodiment, fractionation chambers 110(*n*) are rectangular in shape, have a height of eleven feet, a width of about 6 feet, and a length of about 9 feet.

Referring to FIGS. 2-6, system 10 is shown with first stage fractionation chamber 110, second stage fractionation chamber 115, third stage fractionation chamber 120, fourth stage fractionation chamber 125, and fifth stage fractionation chamber 130. The first, second, third, fourth, and fifth stage fractionation chambers 110, 115, 120, 125, and 130 are sometimes referenced as fractionation chamber 11 (*n*). Fractionation chambers 110(*n*) are arranged in series and are operably connected with a labyrinth of pipes to allow biosolids 50 be transported to each successive fractionation chambers 110(*n*) after treatment in the preceding fractionation chambers 110(*n*).

System 10 further comprises a vacuum-blower pump 90 configured to apply vacuum action to top of fractionation chambers 110(*n*) to remove foam and to discharge air through air discharge exhaust 380. System 10 also comprises air inlet check valves 390(*n*), automated exhaust air valves 400(*n*), a plurality of discharge pumps 410(*n*) associated with each fractionation chamber 110(*n*). A plurality of automated drain valves 420(*n*) are operably connected to pressure transducers 430(*n*) and programmable logic control 100. Drain valves 420(*n*) are preferably positioned at the bottom of fractionation chambers 110(*n*). PLC 100 selectively controls pressure transducers 430(*n*) so that biosolids 50 may be selectively removed from fractionation chambers 110(*n*) and piped to optional dewatering systems as described below. This system utilizing the pressure transducers also allows the operator to adjust the level of the foam at the top of the chamber to meet the need of the vacuum that is pulling the foam off by adjusting the overall level of material in the tank.

A vacuum blower pump 90 serves as an air pressure mechanism to deliver air bubbles to biosolids undergoing the FF process and as the vacuum mechanism to remove the foam 350 (FIG. 3A) from the top of the biosolids 50 in fractionation chambers 110(*n*). The novel use of vacuum blower pump 90 to perform two functions reduces the complexity and operating cost of system 10.

Figure 9:
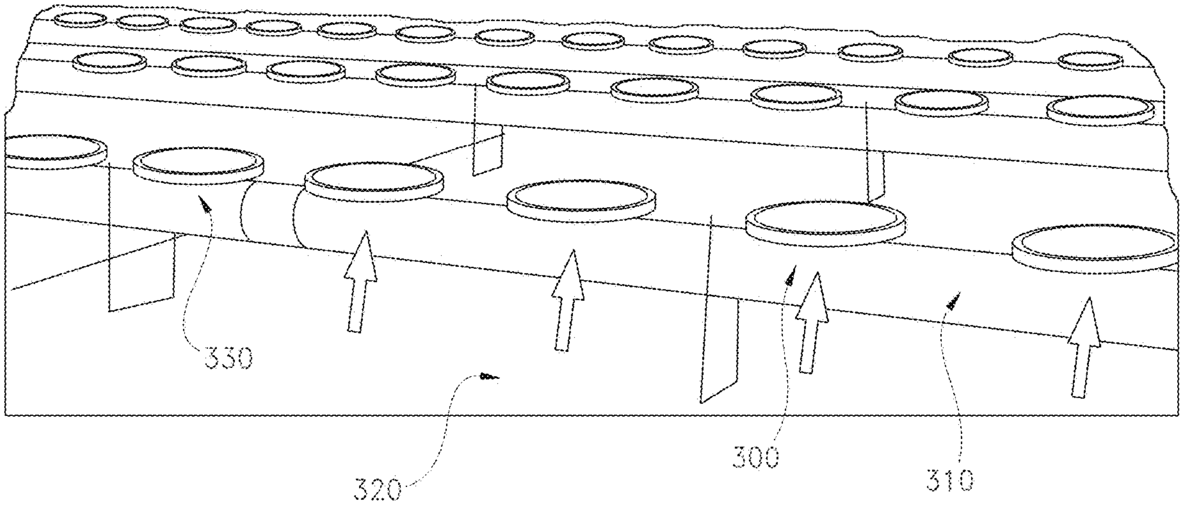
Fig. 9 (Prior Art)
FIG. 9 shows a close up view of a diffuser.

Referring to FIGS. 9, prior art aeration chambers are shown. The claimed inventions overcome problems associated with such prior art systems and correct the problems associated with solids buildup and settling with aeration systems that are part of the FF process. As shown in FIG. 9, prior art systems use an arrangement of diffusers 300(*n*) and pipes 310(*n*) positioned above the floor of aeration tanks 320. This arrangement allows sediment to collect on the floor of aeration tank 320, thereby requiring vac trucks or manual cleaning periodically or additional components to agitate or remove sediment from the floor 320. Typically, air diffusers 300(*n*) have been used for the introduction of air into a body of water. A typical air diffuser installation involves plumbing pipes 310(*n*) on top of the tank floor 320. Pipes 310(*n*) comprises a plurality of Tees 330. The diffussers are raised off the floor and they are Teed into the main diffusser header pipe 310.

Figure 10:
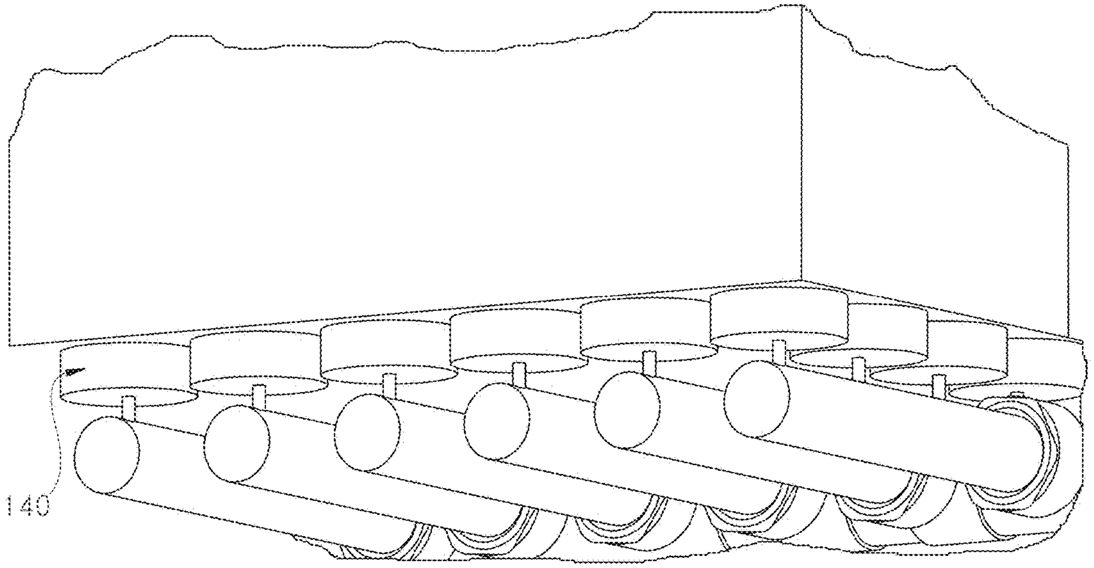
FIG. 10 shows a schematic view of the disc diffusers for a foam fractionation chamber.
Figure 12:
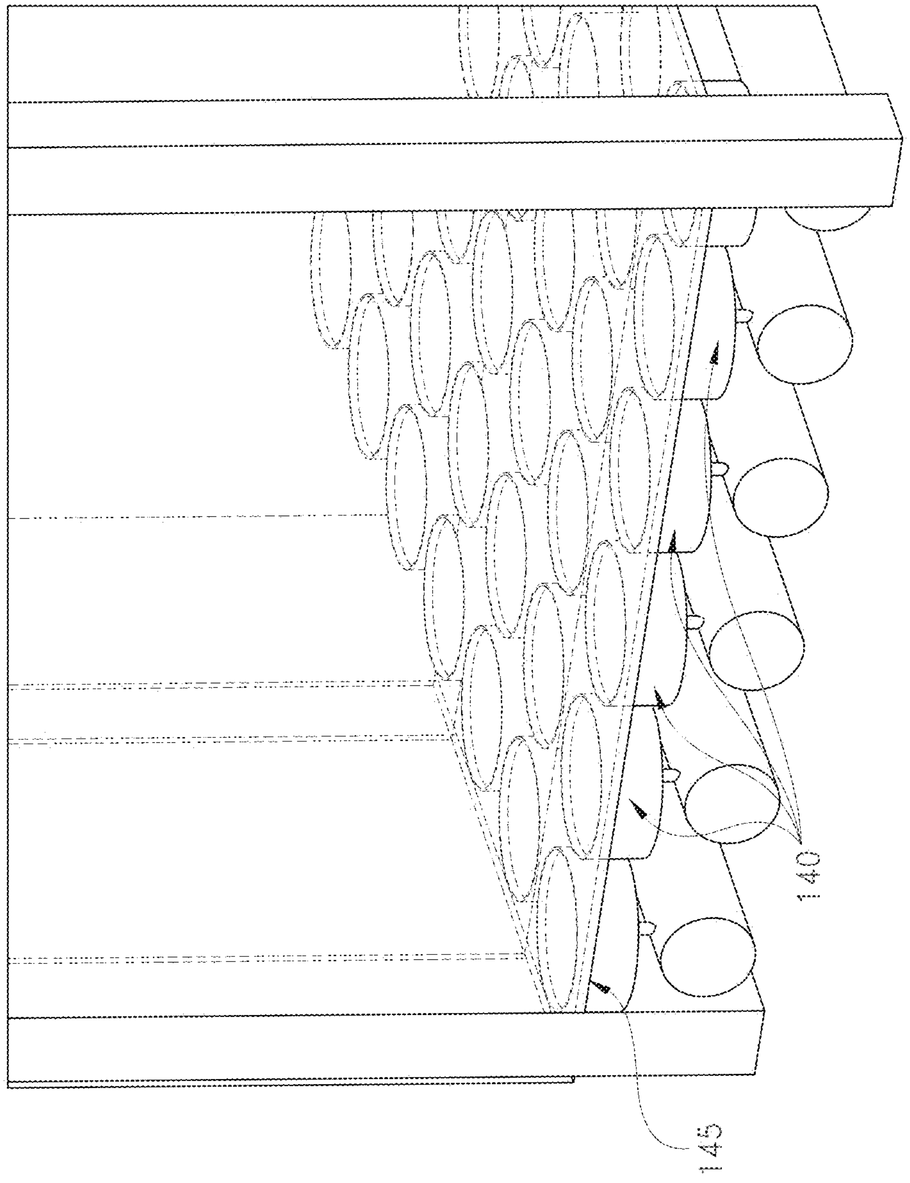
FIG. 12 shows a schematic view of a foam fractionation chamber with diffusers flush with the floor.
Figure 13:
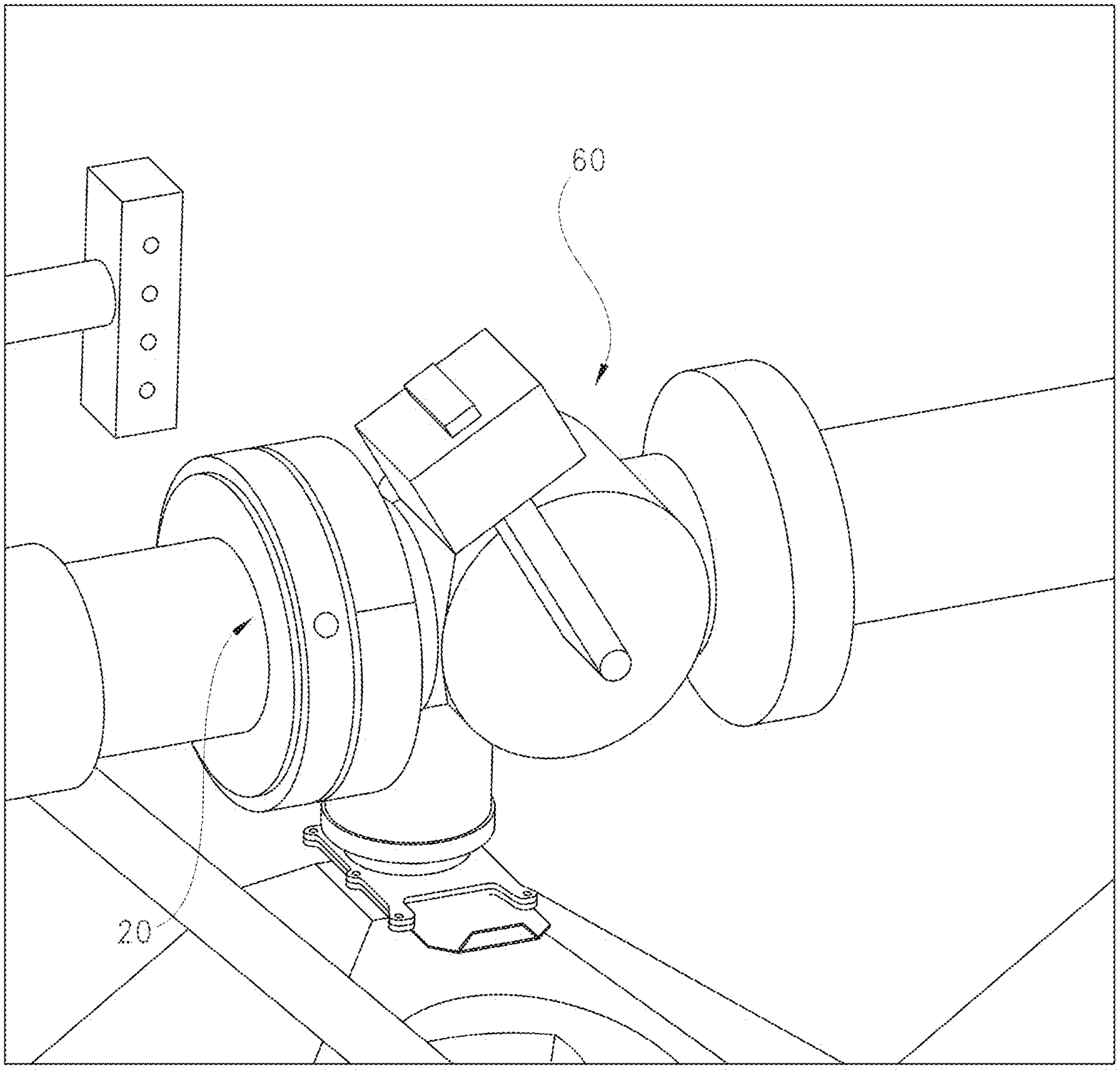
FIG. 13 shows a perspective view of a static mixer.
Figure 14:
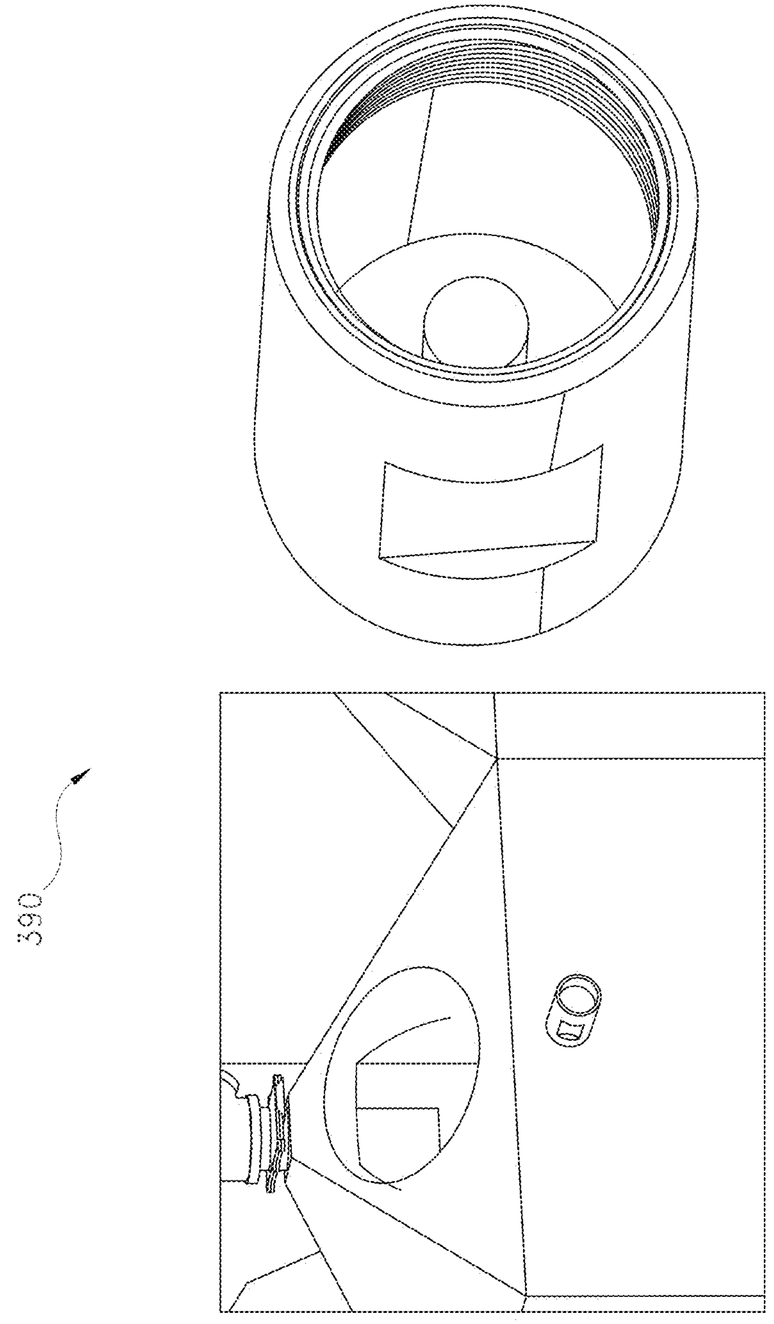
FIG. 14 shows adjustable fresh air inlet check valve.
Figure 15:
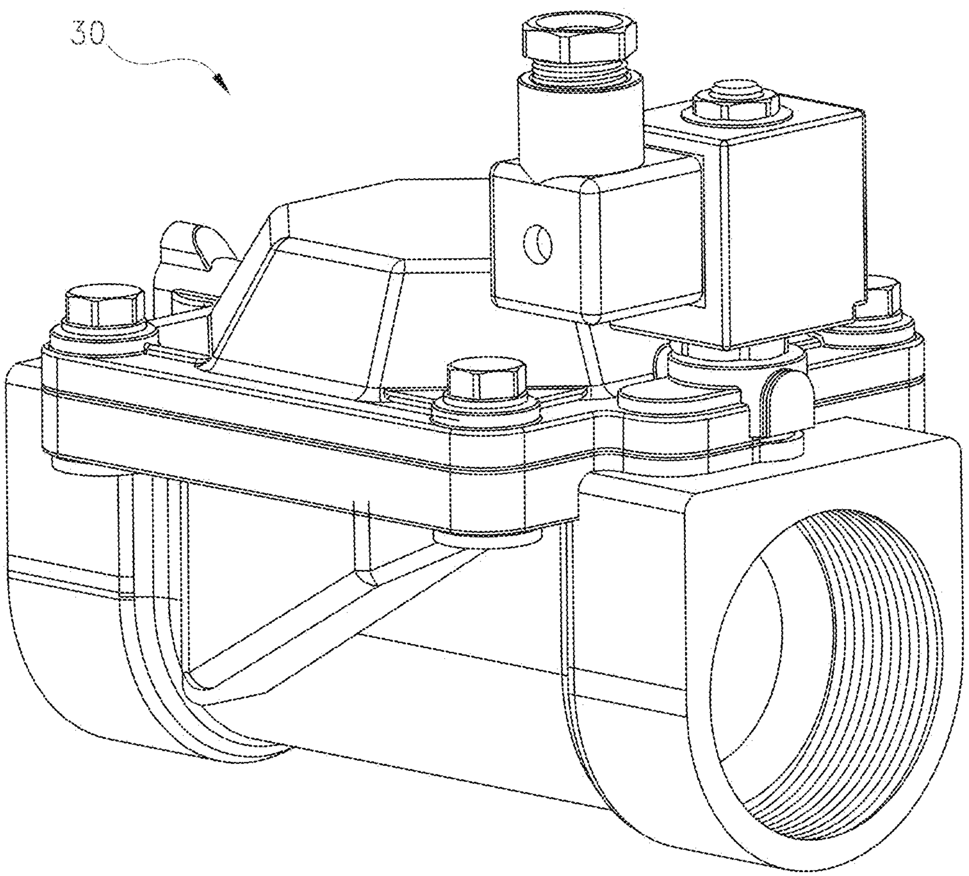
FIG. 15 shows an electronic solenoid valve.
Figure 16:
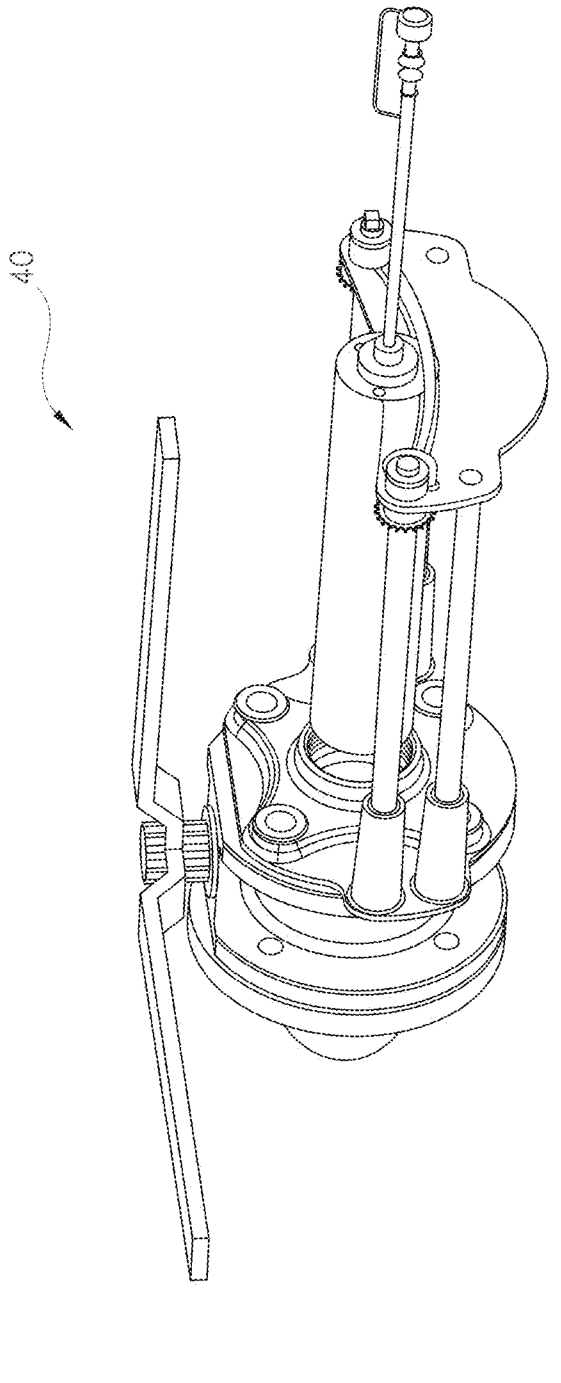
FIG. 16 shows an Solitax HS-Line sc/Immerson 500 g % solids meter.
Figure 17:
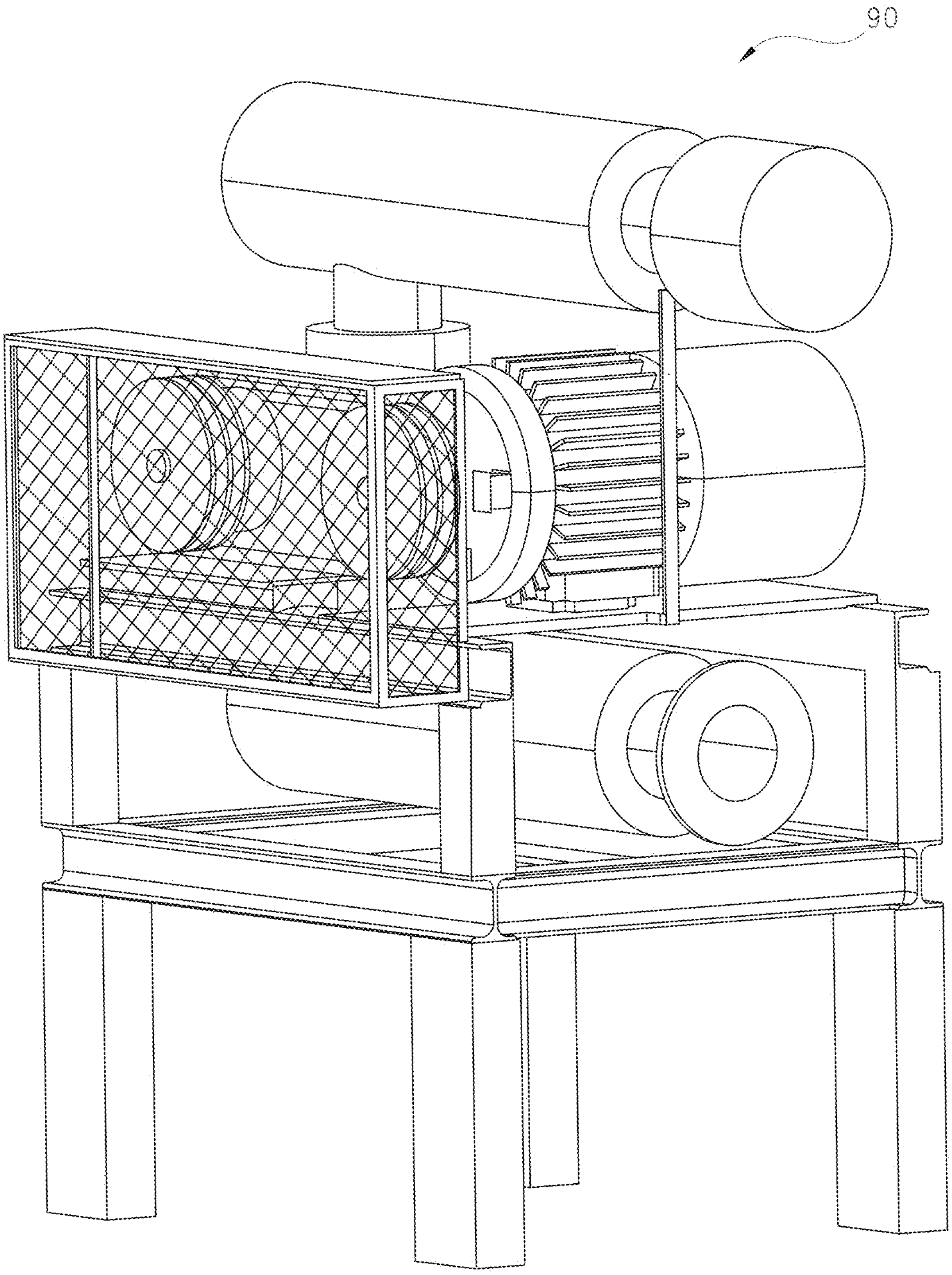
FIG. 17 shows a vacuum pressure blower.
Figure 18:
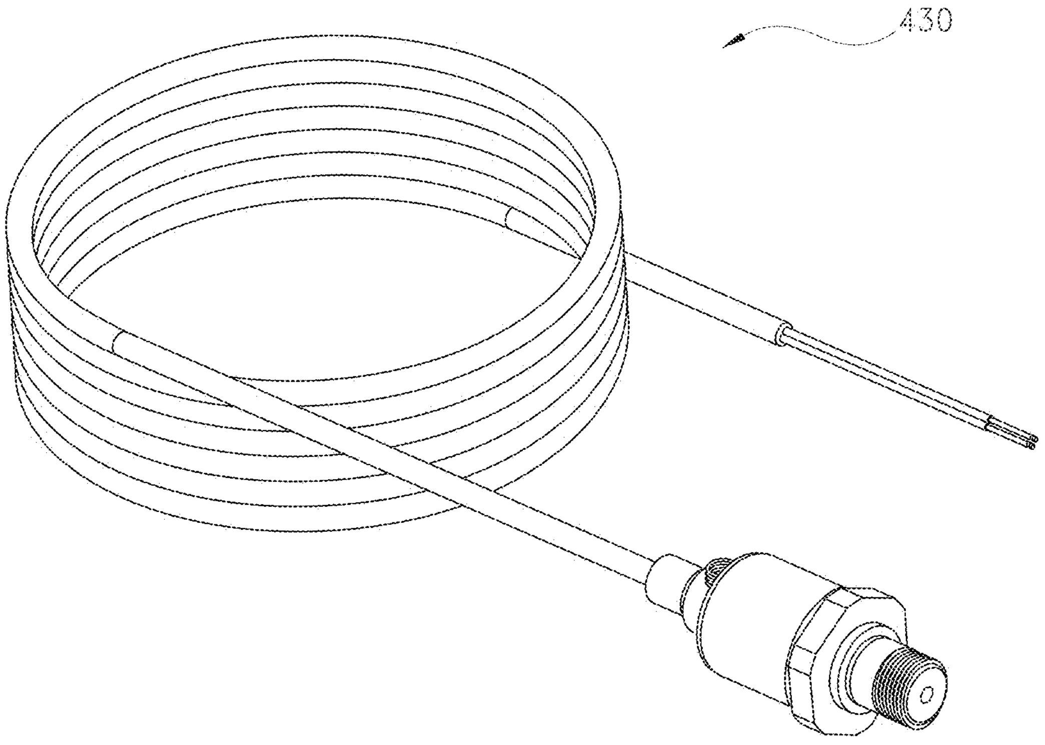
FIG. 18 shows a pressure transducer.
Figure 19:
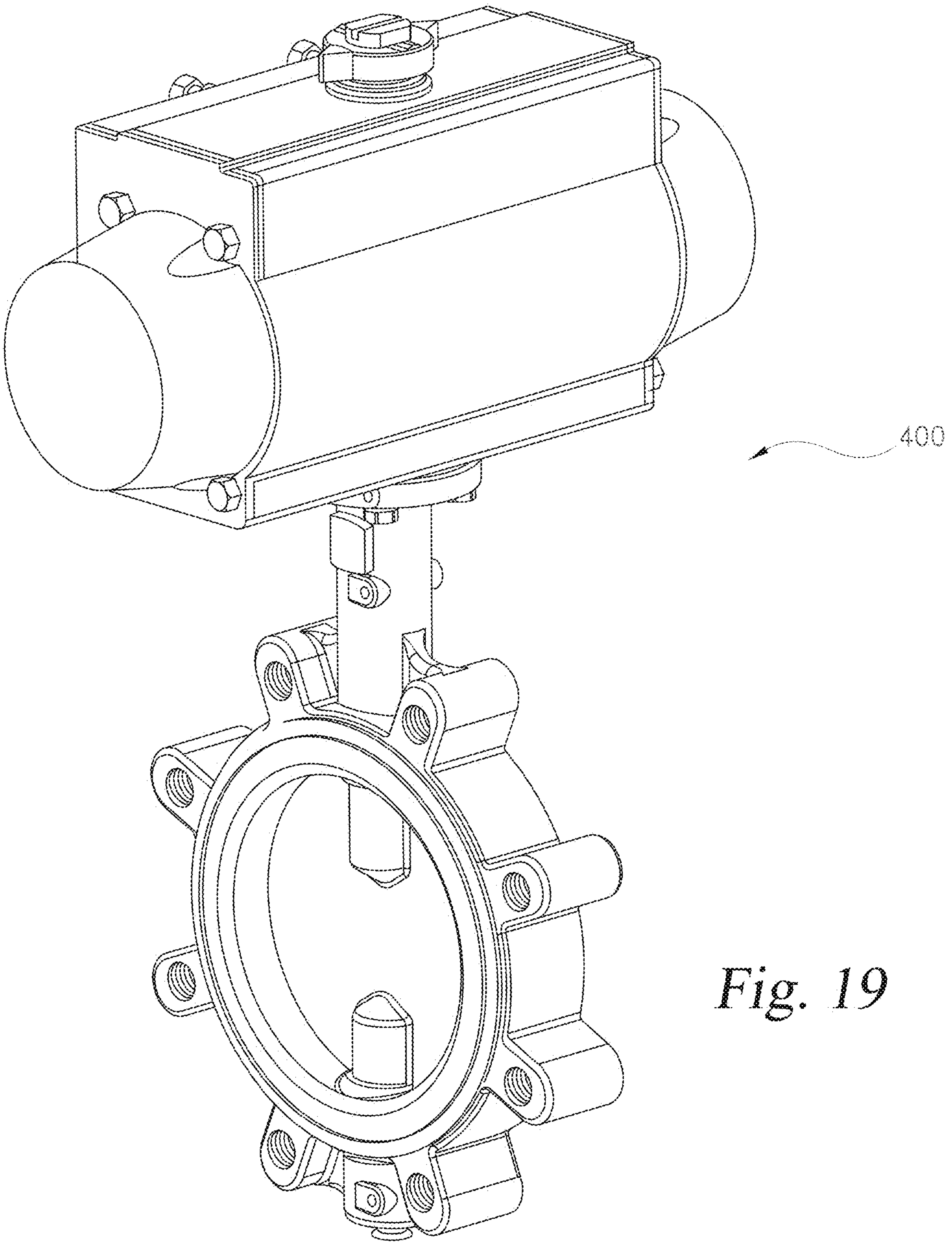
FIG. 19 shows an electronic valve.
Figure 20:
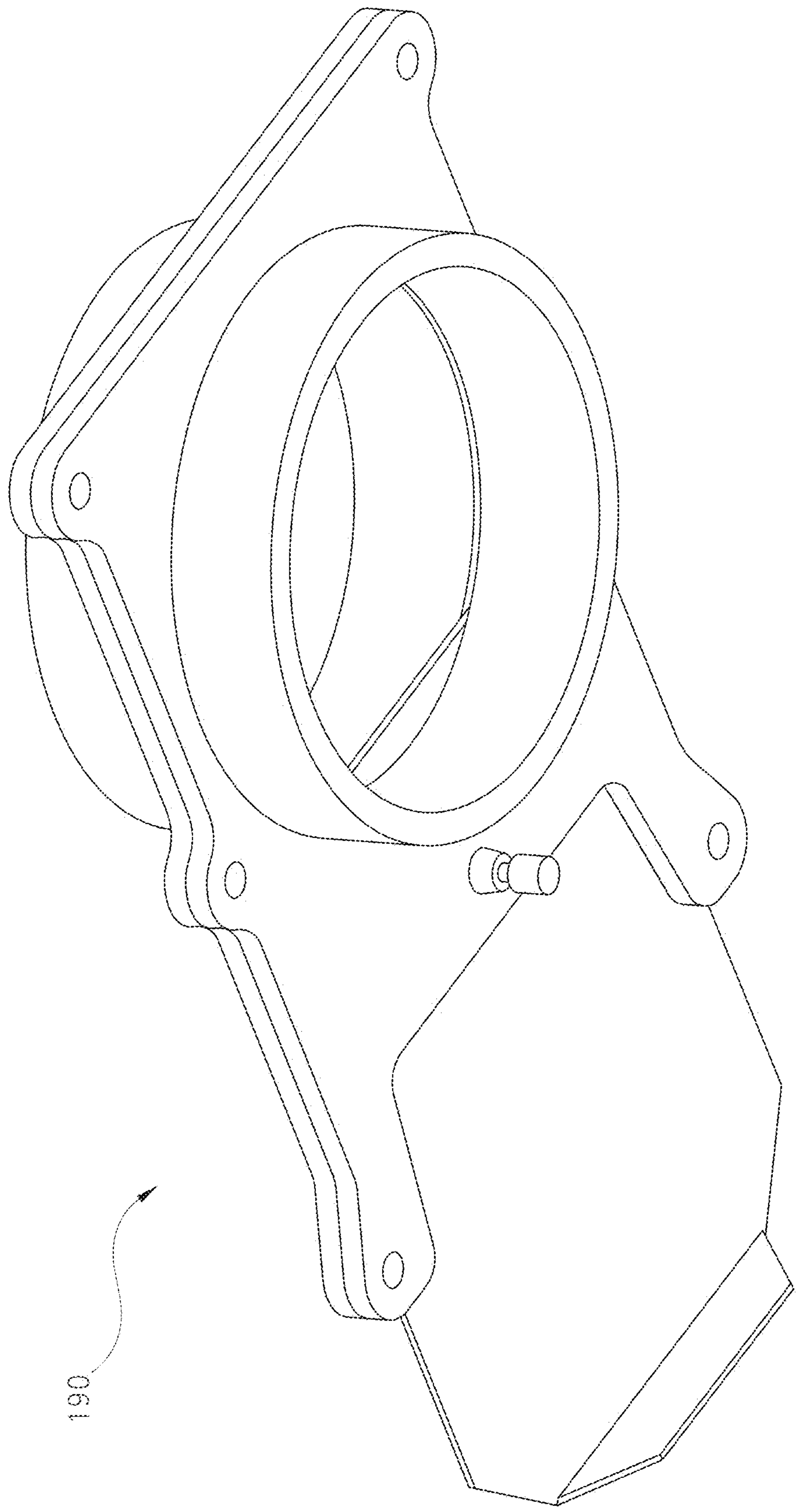
FIG. 20 shows an adjustable slide gate valve.
Figure 21:
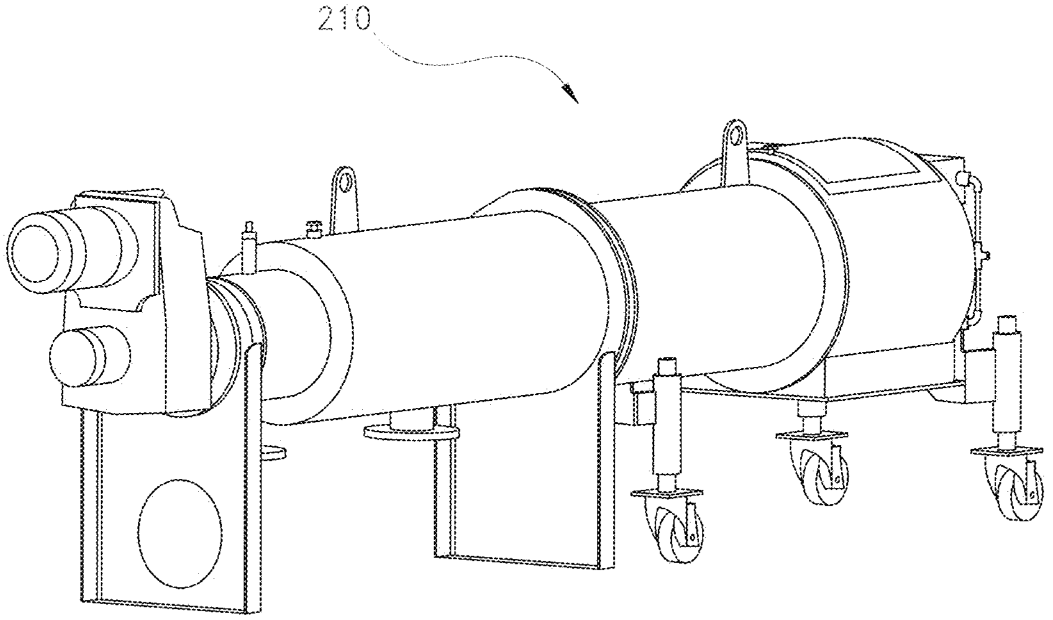
FIG. 21 shows a continuous flow self-cleaning screener.
Figure 21A:
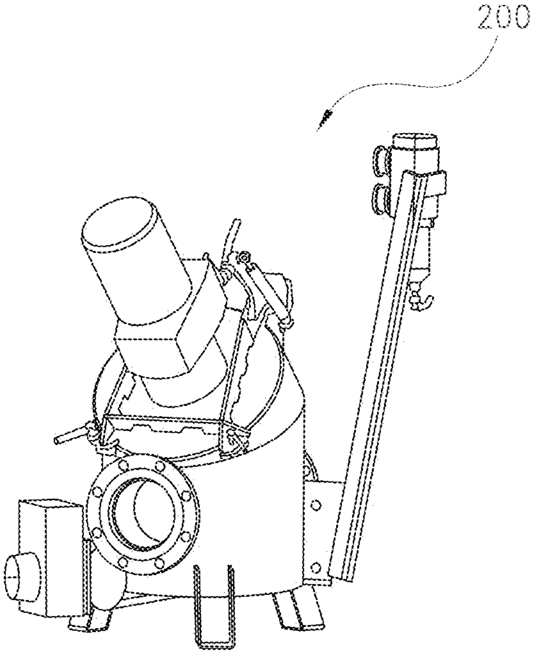
FIG. 21*a* shows a grinder.

Referring to FIGS. 10 and 12, in the novel system 10, disc diffusers 140(*n*) are positioned flush with the FF chamber floor 145 to eliminate or substantially reduce the potential for biosolids 50 to settle on floor 145. The plurality of diffusers 140(*n*) are positioned substantially across the entire surface of floor 145. The disclosed inventions inhibit accumulation of biosolids 50 on floor 145 by recessing the diffusers 140(*n*) into the floor 145, allowing the diffusers 140(*n*) to be flush with the bottom of the chamber floor 145. The continuous pressurized air traveling up through the diffusers 140(*n*) prevents solids 50 or other material from settling onto the floor 145. This novel approach causes substantially all biosolids 50 to move through fractionation chambers 110(*n*) and ultimately be processed without significant accumulation. Additionally, this structure and method assures substantially complete treatment for PFAS removal from all biosolids 50.

Programmable logic control 100 (PLC) is operatively connected to the components of the system 10 to selectively control the flow of biosolids 50 through system 10. Referring to FIG. 10, foam fractionation chambers 110(*n*) have a plurality of disc diffusers 140(*a-n*). The number of disc diffusers 140(*n*) may vary without departing from the scope of the invention. The disc diffusers 140(*n*) are positioned at the bottom of fractionation chambers 110(*n*) to diffuse or separate biosolids 50. The number of diffusers 140(*n*) may vary depending on the size and construction of fractionation chambers 110(*n*). Additional features are described in greater detail below.

Disc diffusers 140(*n*) are positioned on the floor of fractionation chambers 110(*n*) to allow for the fractionation of thicker biosolids 50 without biosolids 50 settling out precipitating to the bottom of fractionation chambers 110(*n*) and plugging system 10. Disc diffusers 140(*n*) impart force on biosolids 50 to continuously blow biosolids 50 off the bottom of fractionation chambers 110(*n*).

Referring to FIG. 1-6, biosolids 50 are introduced to the system 10 through an inlet pipe 20. A continuous flow percent solids meter 40 measures the solid content of the biosolids prior to entering the system 50. In one embodiment, the percents solids meter 40 is a turbidity and suspended solids immersion probe such as Solitax HS-Line sc/Immerson 500 g/Wiper SS. The biosolids 50 need to be about 1% solids by volume before entering fractionation chambers 110(*n*). If the biosolids 50 in inlet pipe 20 comprise more than about 1% solids, the meter 40 sends a signal to first valve 30. Valve 50 may be any type of electronic solenoid water valve such as Granzow 2 inch WpB19-000 solenoid water valve or equivalent. The valve 30 is operable to allow water to be introduced into the biosolids 50 in the inlet pipe 20. The meter 40 and valve 30 communicate with each other using electronic signals to determine when a sufficient amount of water has been added to biosolids 50 to reduce the solids content to about 1%. The water is added to biosolids 50 and then travels immediately into a static mixer 60. Once the biosolids 50 are measured by meter 40 to contain about 1% solids, the biosolids 50 travel from the inlet pipe 30 through a series of weirs that intentionally force the biosolids to flow back and forth to increase the dwell time they are in the velocity flowing chamber 70.

Once appropriately diluted, the biosolids 50 are introduced to a first stage foam fractionation chamber 110. Inside this first stage FF chamber 110, a plurality of disc diffusers 140(*n*) are positioned at the bottom of chamber 110. In a preferred embodiment, each disc diffuser 140 may be about 9 inches in diameter and comprises a plurality of slits to permit air to pass through the diffuser 140. Diffusers 140(*n*) are recessed into the floor of the chamber 110 so that diffusers 140(*n*) are positioned flush with the bottom of the chamber 110. The diffusers 140(*n*) are commonly sold through SS Aeration Co. or similar vendors. In a preferred embodiment, selecting 2 mm slits increases the effectiveness of the FF process by limiting the size of the air bubbles. Limiting the size of the air bubbles increases the aggregate surface area of all the air bubbles in the chamber 110. Maximizing the aggregate surface area of the bubbles allows for greater absorption of PFAS in the bubbles. Diffusers 140(*n*) pump about 5-15 cubic feet per minute (cfm) of compressed air using a positive displacement blower into each diffuser 140(*n*). In one embodiment, a Roots 36URAI or 711 URAI type blower is used. Depending on the size of the FF chambers 110(*n*) other types of blowers 90 may be used. The compressed air creates bubbles that travel through biosolids 50 in fractionation chambers 110(*n*). During this bubbling, hydrophobic PFAS compounds and microplastics release from the biosolids 50, attach to the bubbles, and the bubbles take the PFAS compounds to the top surface of biosolids 50 in fractionation chambers 110(*n*).

Figure 11:
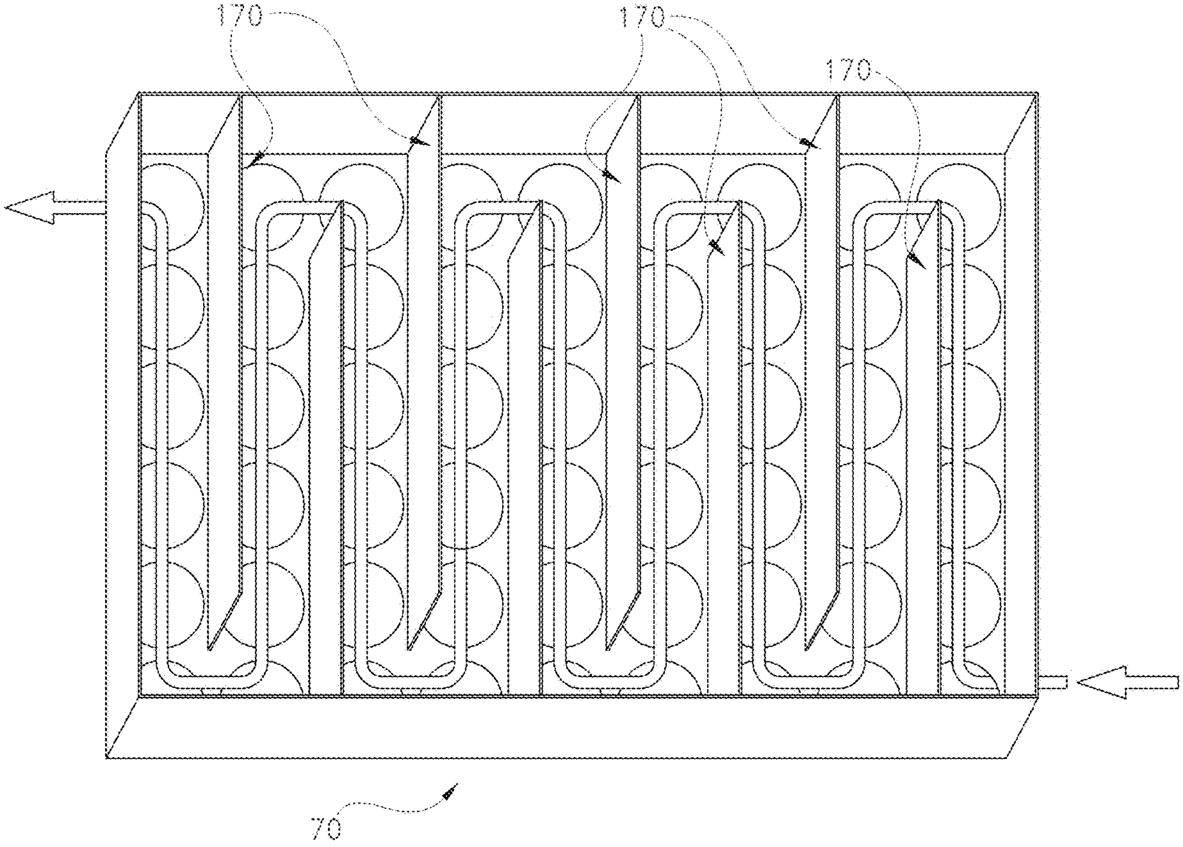
FIG. 11 shows a top view of a foam fractionation chamber with an array of weirs and the flow pattern.

Referring to FIG. 11, an exemplary fractionation chamber 110(*n*) is shown. Fractionation chambers 110(*n*) will be substantially similar in design and function. However, the disclosed inventions encompass systems 10 in which fractionation chambers 110(*n*) may be of different sizes and configurations.

Inside fractionation chambers 110(*n*), a plurality of weir plates 170(*n*) are positioned. The weir plates 170(*n*) act as baffles in fractionation chambers 110(*n*) to direct and control the rate and directional flow of biosolids 50. The weir plates 170(*n*) divert the biosolids 50 flow and increase the detention time that the biosolids 50 remain in fractionation chambers 110(*n*). As the time during which biosolids 50 are subject to FF increases, the greater volume of PFAS is removed from biosolids 50. In one embodiment, biosolids are subject to FF for about 20 minutes in each fractionation chamber 110(*n*). A person of ordinary skill will recognize that the precise time to perform FF on biosolids 50 may be more or less than 20 minutes to achieve the desired amount of PFAS removal.

Figure 3:
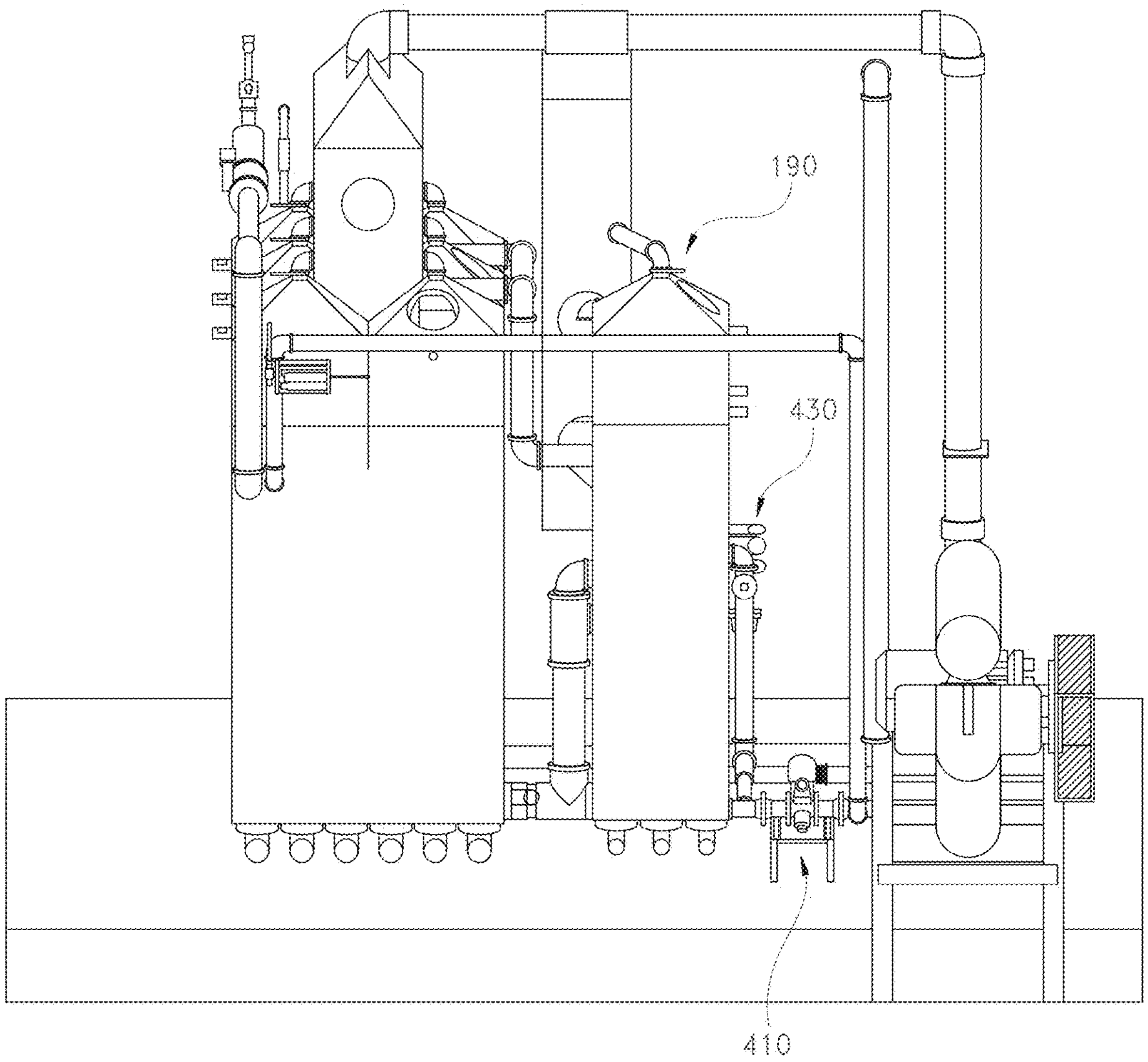
FIG. 3 shows a first side perspective view of a foam fractionation system for treating biosolids.
Figure 3A:
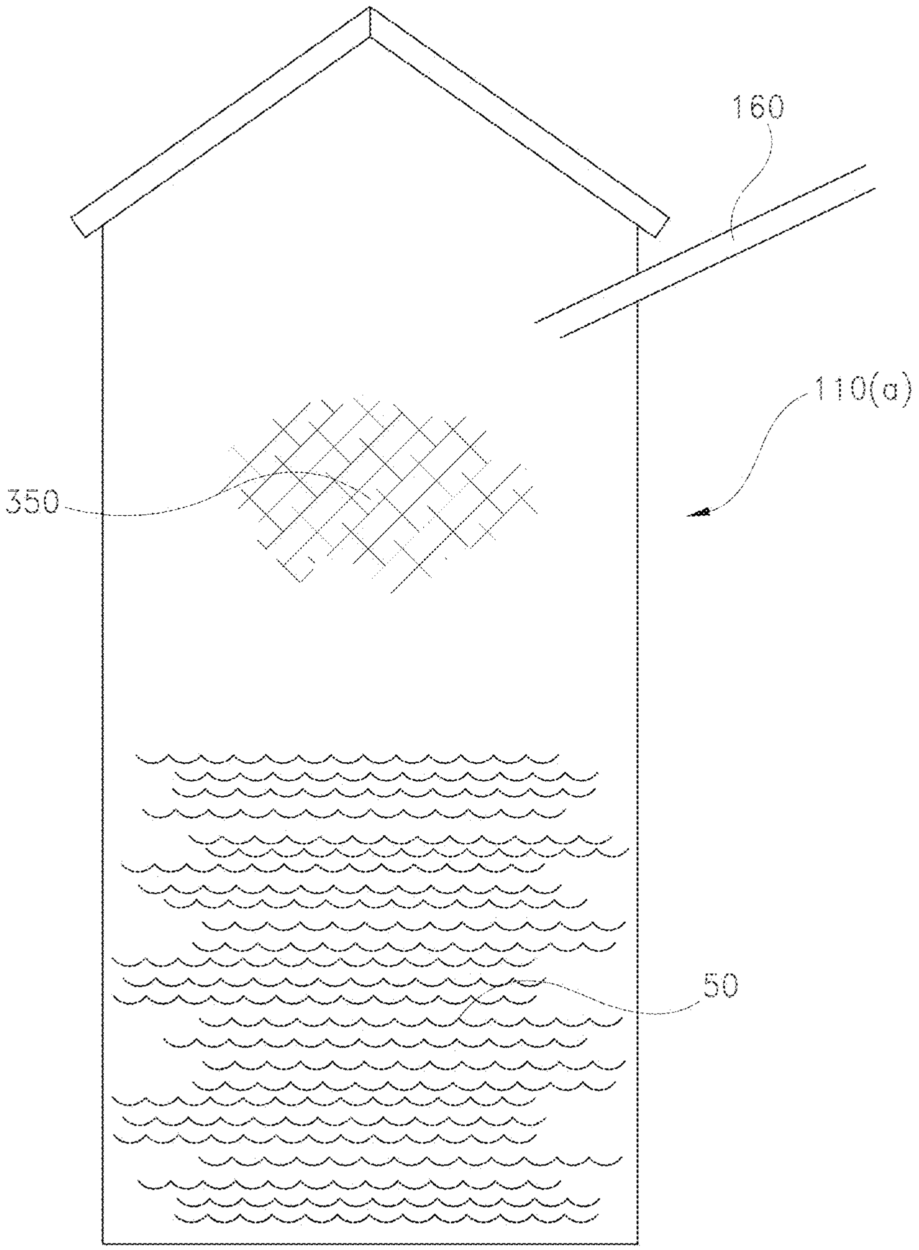
FIG. 3A shows a cross-sectional view of a foam fractionation chamber containing biosolids and foam.
Figure 4:
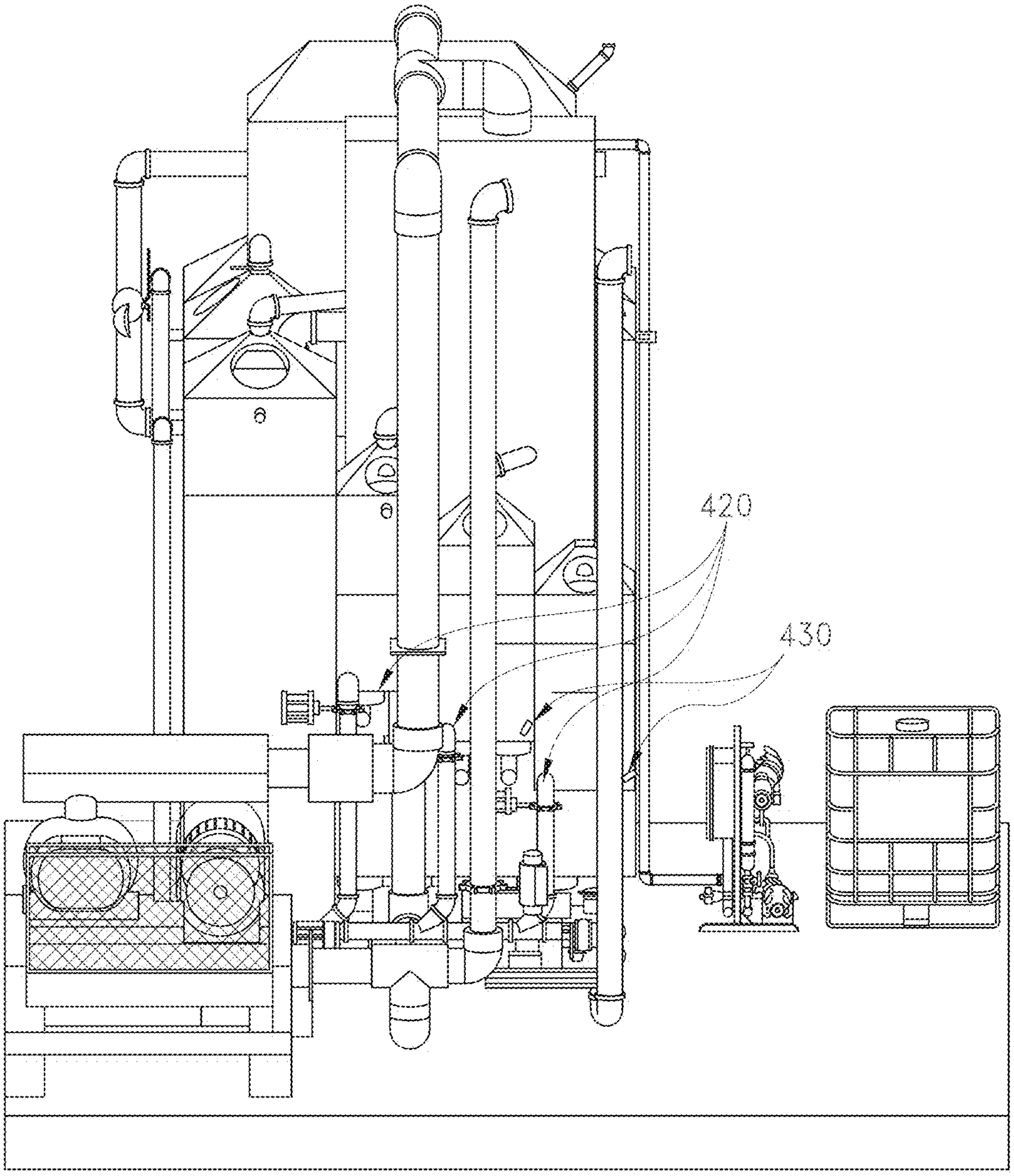
FIG. 4 shows a second side perspective view of a foam fractionation system for treating biosolids.
Figure 5:
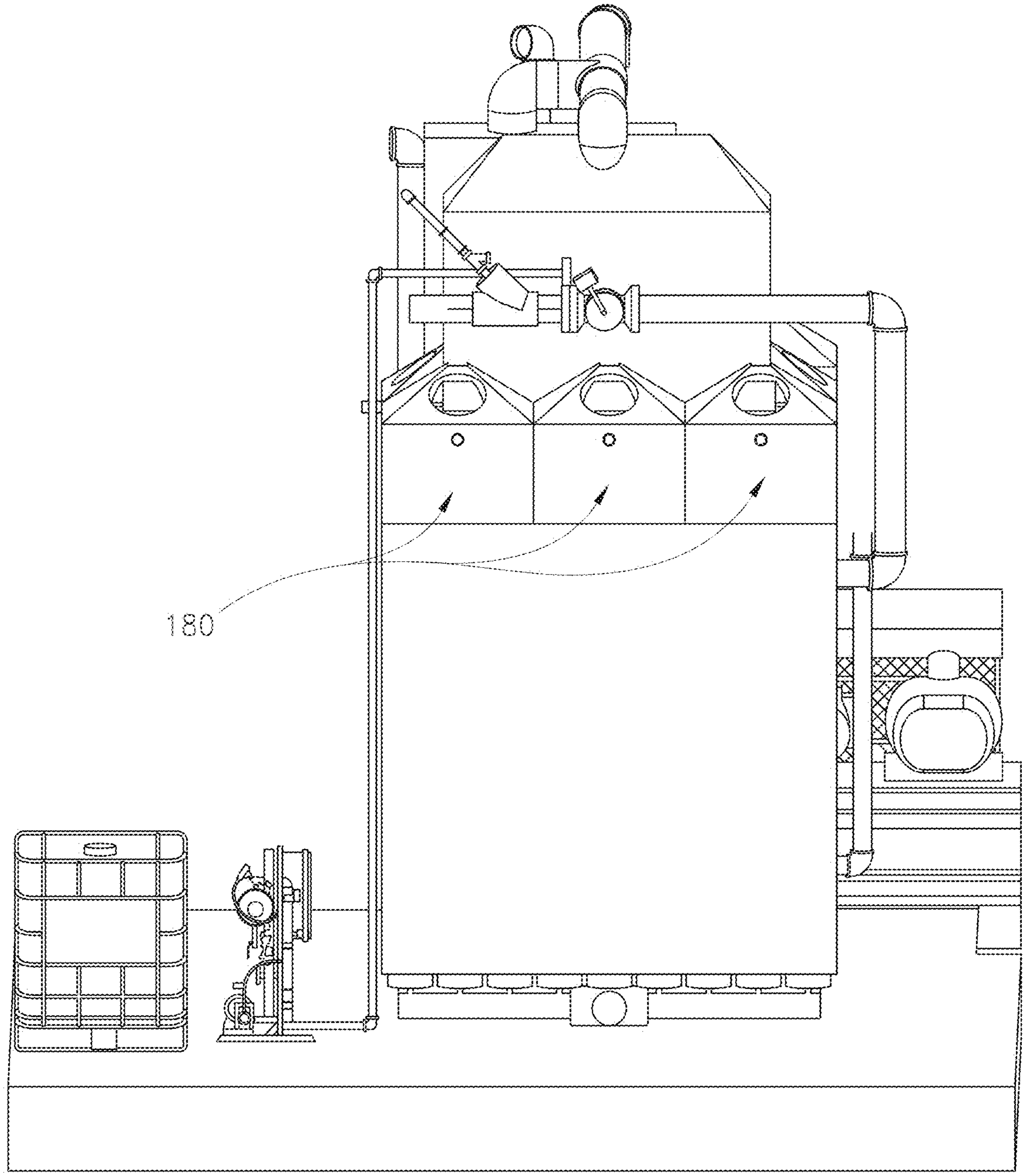
FIG. 5 shows a third side perspective view of a foam fractionation system for treating biosolids.
Figure 6:
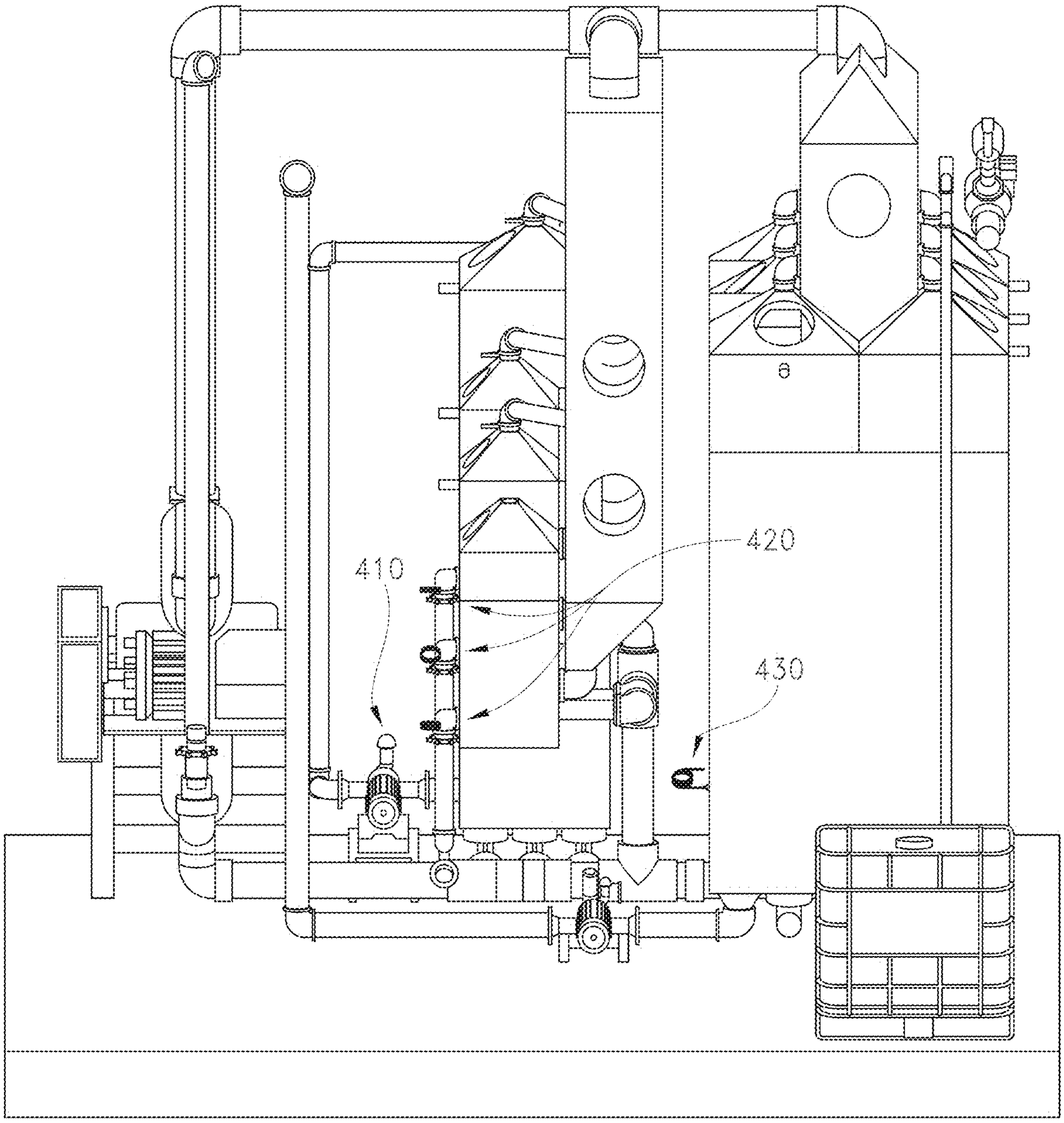
FIG. 6 shows a fourth side perspective view of a foam fractionation system for treating biosolids.
Figure 7:
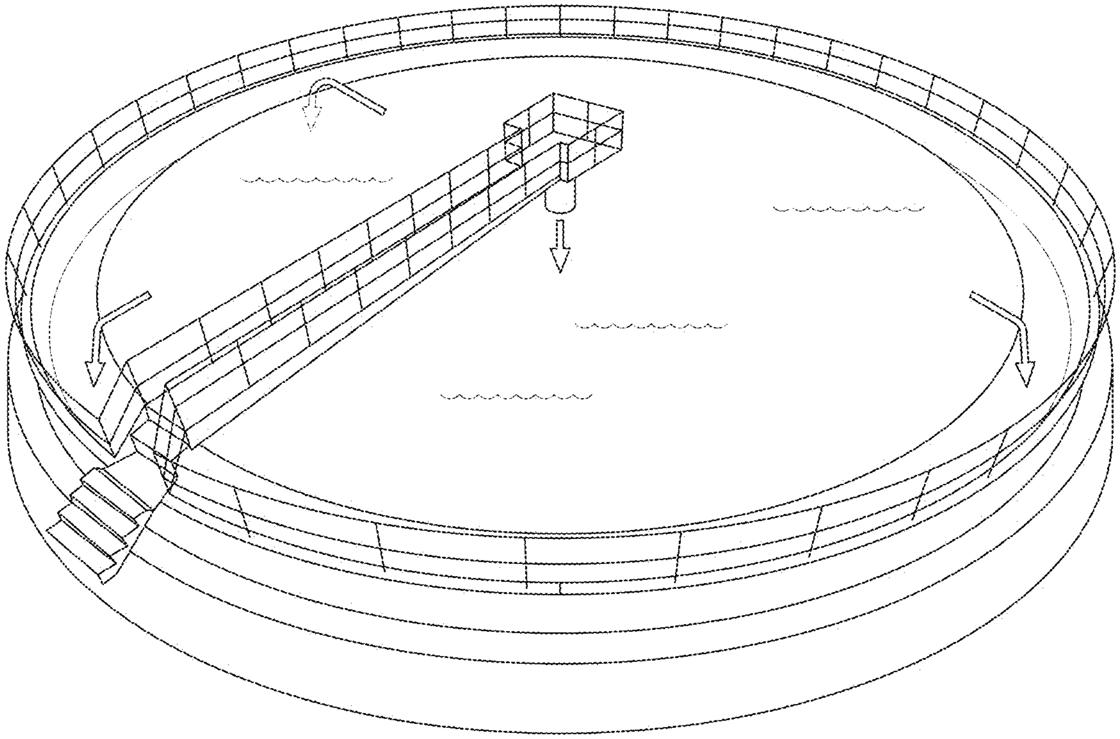
Fig. 7 (Prior Art)
FIG. 7 shows a top view of a prior art clarifier tank.
Figure 8:
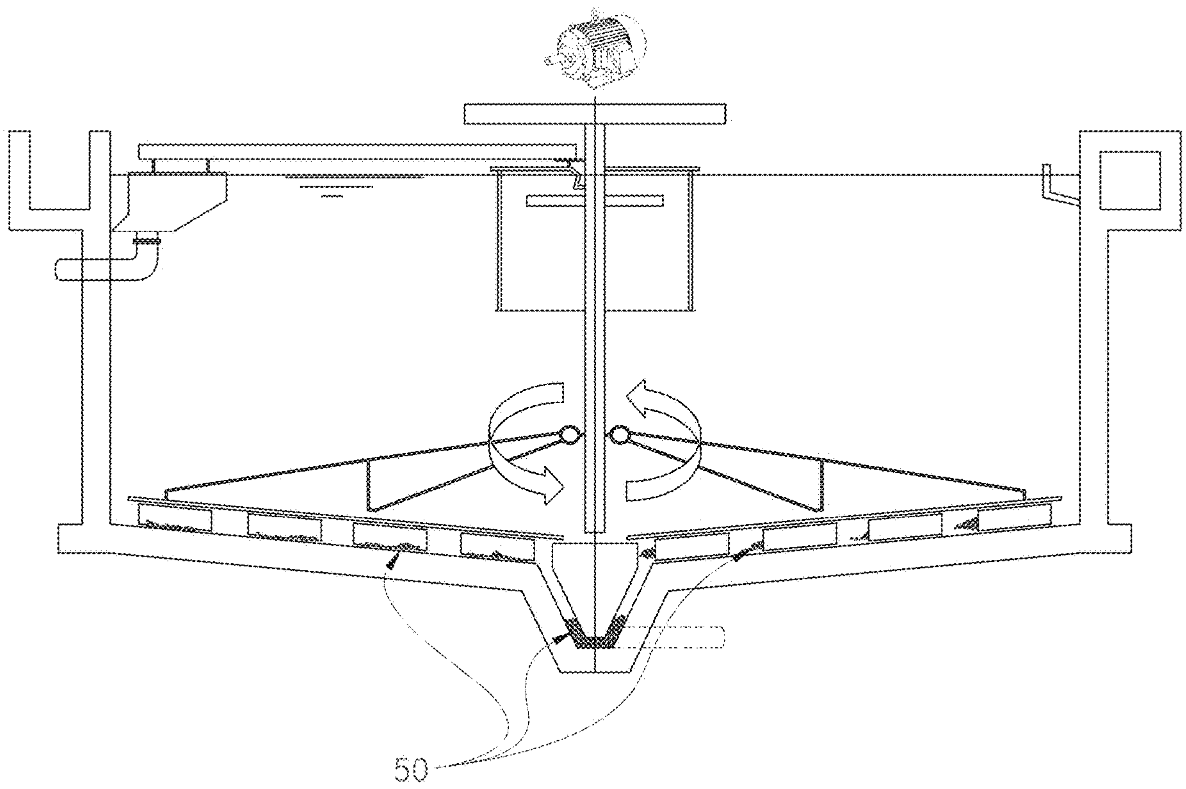
Fig. 8 (Prior Art)
FIG. 8 shows a cross-section view of a prior art clarifier tank.

Referring to FIGS. 3A and 12, as the air bubbles rise to the surface of the fractionation chambers 110(*n*), they accumulate on top of the biosolids 50 as foam 350. Vacuum 240 removes foam 350 off the top of biosolids 50 by the inlet side of the vacuum blower 90. The depth of the foam 350 and rate of removal are all controlled by someone skilled in the art of operating the system 10 using PLC 100. Fractionation chambers 110(*n*) are operable to allow a user to adjust the level of foam 350 in fractionation chambers 110(*n*) for efficient operation of vacuum 240.

In some embodiments, fractionation chambers 110(*n*) have a vacuum hood 180. Vacuum hood 180 may have an adjustable slide gate valve 190 to regulate the amount of vacuum in fractionation chambers 110(*n*) to regulate the rate of foam removal. This rate of removal is important so that no more foam 350 than may be desired is removed from fractionation chambers 110(*n*). If too much foam 350 is removed, additional foam concentrate will be generated which reduces the efficiency of system 10.

Another complication related to FF with high solid content biosolids 50 is called the insulation factor. PFAS particles exist throughout a solid particle. Even though some PFAS compounds are hydrophobic, they can remain insulated inside a solid particle and therefore stay in the biosolids 50. These inventions incorporate the use of a disintegration grinder 200 and a continuous flow self-cleaning screener 210 to remove any unwanted particles larger than a predetermined size. The self-cleaning screener 210 removes unwanted particles like trash, plastic, string, and the like, which are then disposed in a landfill. The grinder 200 then acts on the remaining biosolids 50 to reduce particle size to expose the PFAS to foam fractionation.

Figure 22:
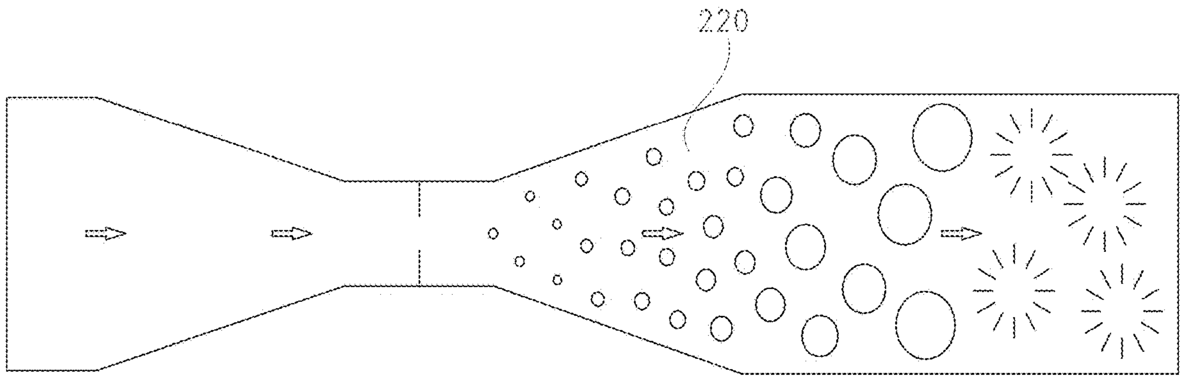
FIG. 22 shows a Venturi hydrodynamic cavitation system.
Figure 22A:
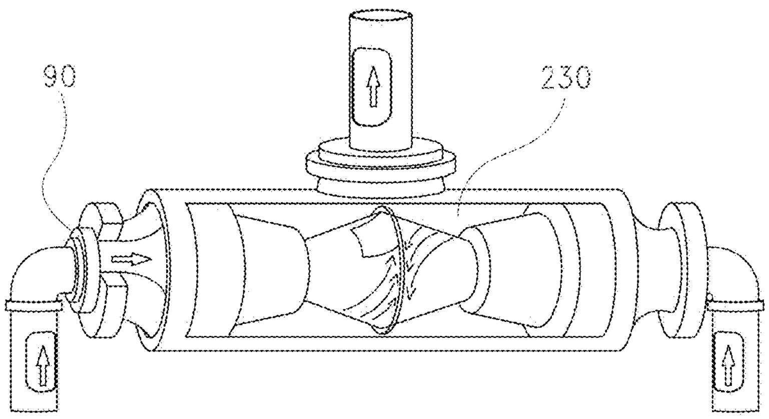
FIG. 22*a* shows a mechanical hydrodynamic cavitation system.
Figure 22B:
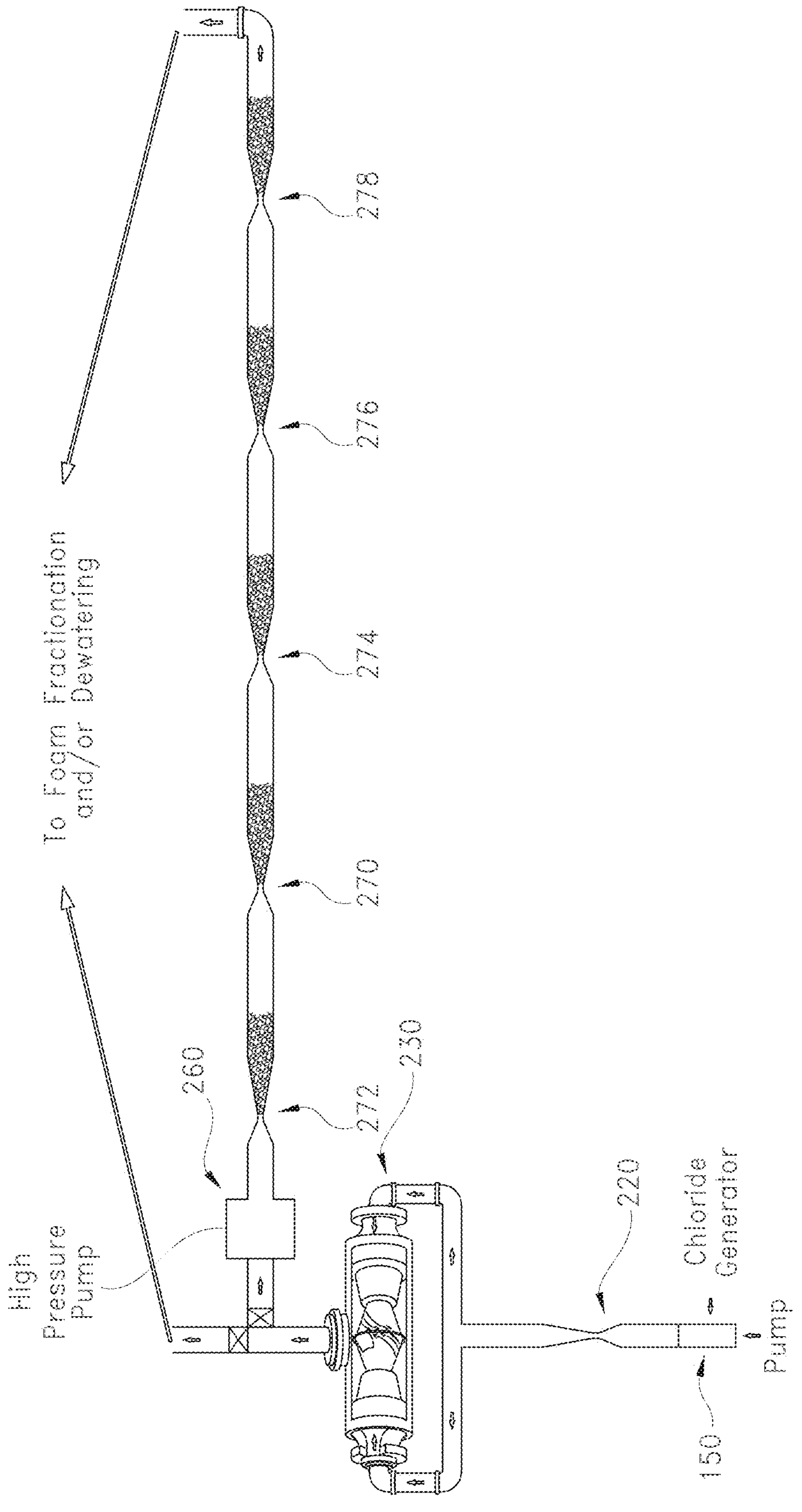
FIG. 22*b* shows perspective view of one embodiment of a hydrodynamic cavitation system.
Figure 23:
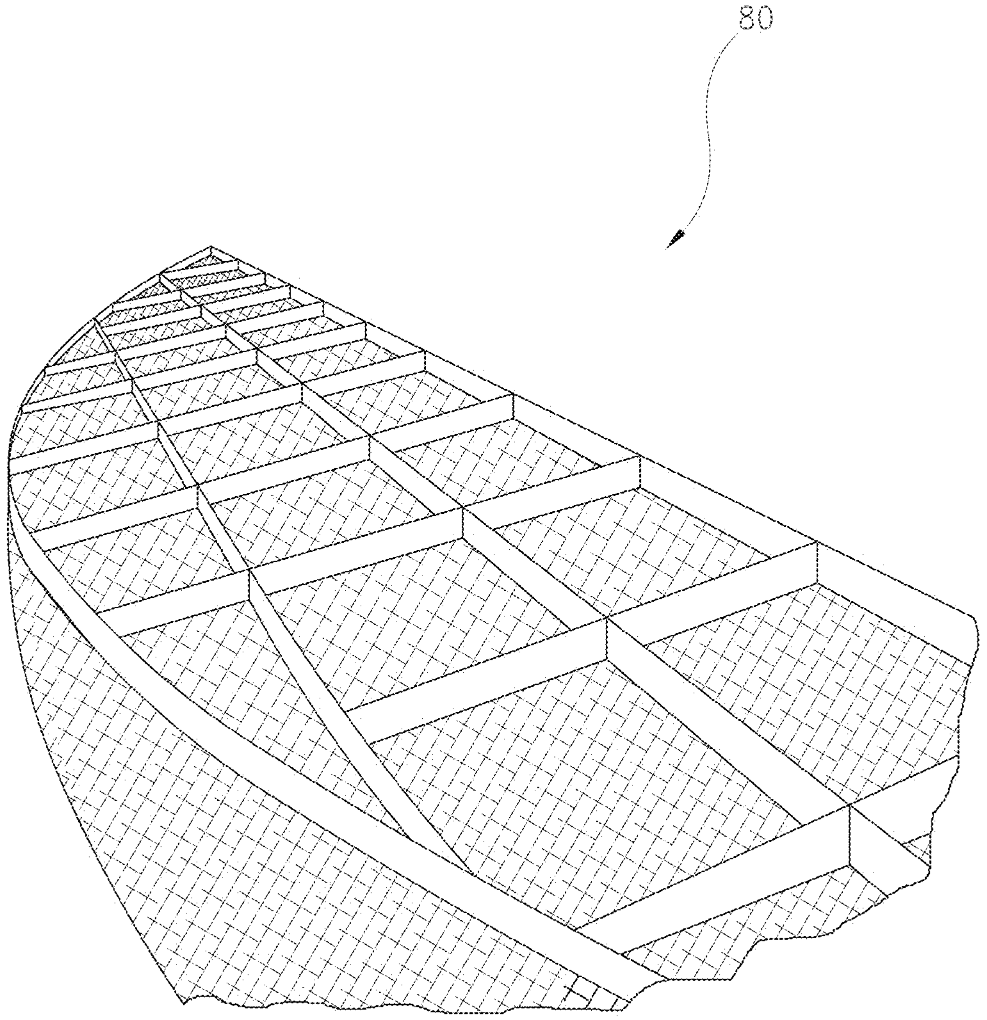
FIG. 23 shows a demister

As shown in FIGS. 22*a*-*b*, an embodiment of the invention includes at least one component to perform hydrodynamic cavitation on the biosolids, preferably before the biosolids undergo foam fractionation or dewatering. As shown in FIG. 22*b*, a pump 90 injects biosolids 50 to chloride generator 150. Chloride generator utilizes electrolysis to convert any salts that are in the biosolids into chlorine gas. 150 After the biosolids 50 are treated by chloride generator 150, biosolids 50 are directed into first venturi hydrodynamic cavitation chamber 220. As biosolids pass through first venturi hydrodynamic cavitation chamber 220 the venturi effect creates negative pressure bubbles that collapse and create supercritical water oxidation conditions 50 to destroy PFAS and microplastics from biosolids 50. Pipe 20 then conveys biosolids 50 to mechanical hydrodynamic cavitation chamber 230.

Mechanical hydrodynamic cavitation chamber 230 acts on biosolids in a similar manner to create supercritical water oxidations conditions. Biosolids then exit mechanical hydrodynamic cavitation chamber 230. In an alternative embodiment, biosolids 50 are directed to high pressure pump 260. High pressure pump 260 increases the pressure of biosolids 50 and directs them to a second venturi hydrodynamic cavitation chamber 270. Second venturi hydrodynamic cavitation chamber 270 acts on biosolids 50 in a manner similar to first venturi hydrodynamic cavitation chamber 220 to disrupt and reduce PFAS and microplastics from biosolids 50. As shown in FIG. 22*b*, one embodiment of system 10 comprises third, fourth, fifth, and sixth venturi hydrodynamic cavitation chambers 272, 274, 276, 278 to further reduce PFAS and microplastics content from biosolids. In another embodiment, biosolids 50 leave mechanical hydrodynamic cavitation chamber 230 and are delivered to foam fractionation chamber as described in greater detail below. Alternatively, biosolids 50 leave mechanical hydrodynamic cavitation chamber 230 and are delivered to mechanical dewatering as described in greater detail below.

Figure 24:
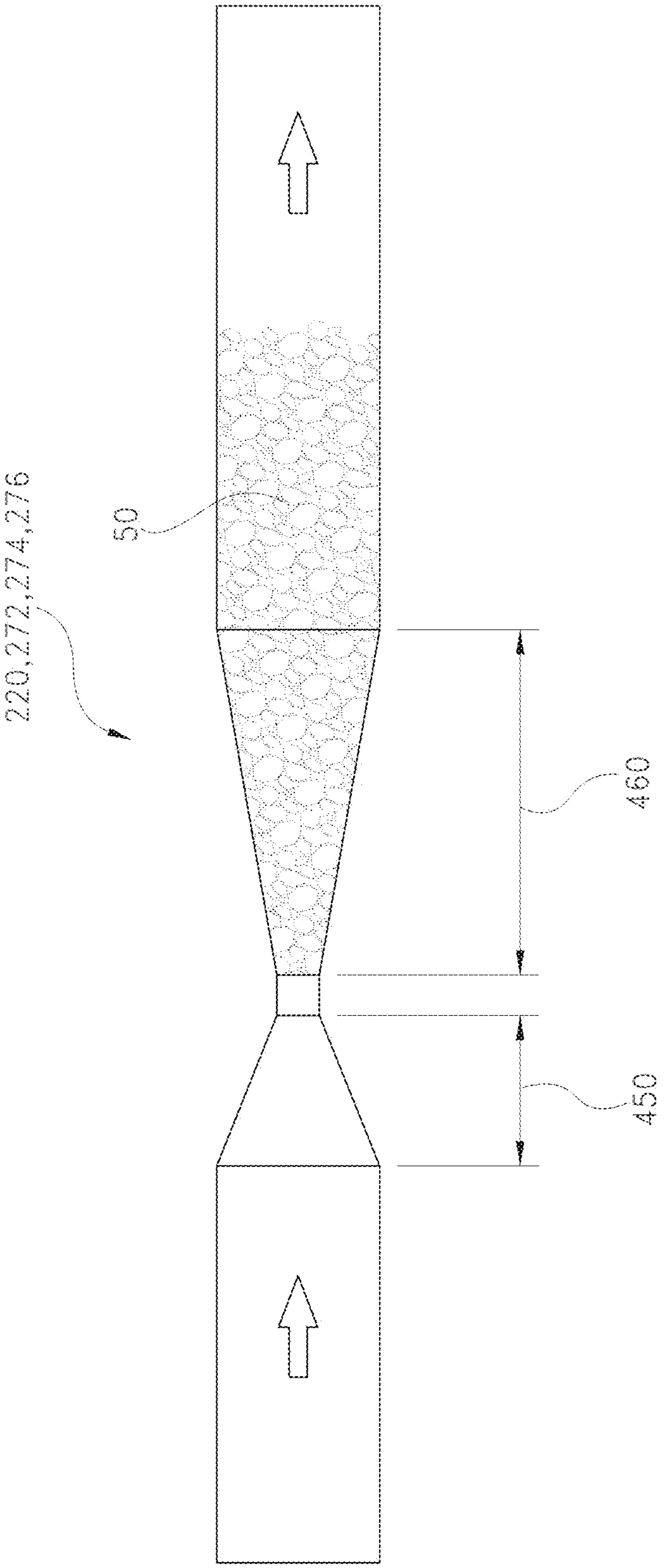
FIG. 24 shows a perspective view of a venturi hydrodynamic cavitation device.

FIG. 24 shows one embodiment of a venturi hydrodynamic cavitation chamber 230, 270, 272, 274, 276, 278. In one embodiment, venturi hydrodynamic cavitation chamber 220 has a diameter of about 4". Venturi hydrodynamic cavitation chamber 220 comprises a convergent section 450 and a divergent section 460. In convergent section 450, the diameter of chamber 220 restricts at a rate of about 22.5° until the diameter is about 0.75". After biosolids 50 pass through convergent section 450, they enter divergent section 460. In the divergent section 460 the diameter increases from about 0.75" at a rate of about 7° until it again reaches 4".

Hydrodynamic cavitation is the process of bubble formation, expansion and violent collapse which results in the generation of high pressures up to about 1600 bar and temperatures up to about 4600° Kelvin for a fraction of a seconds. Cavitation occurs if the local pressure declines to some point below the saturated vapor pressure of the liquid and subsequent recovery above the vapor pressure. In pipe systems, cavitation typically occurs either as the result of an increase in the kinetic energy (through an area constriction) or an increase in the pipe elevation. Hydrodynamic cavitation can be produced by passing a liquid through a constricted channel at a specific flow velocity or by mechanical rotation of an object through a liquid. In the case of the constricted channel and based on the geometry of the system, the combination of pressure and kinetic energy can create the hydrodynamic cavitation cavern downstream of the local constriction generating high energy cavitation bubbles. In a closed fluidic system, a decrease in cross-sectional area leads to velocity increment and static pressure drop. In one embodiment, the grinder 200 and self-cleaning screener 210 remove any particles larger than about 2 mm in diameter. Other embodiments may use grinders 200 and screeners 210 to remove particles exceeding a predetermined threshold that may be smaller or larger than 2 mm in diameter. This screening, combined with violent aeration, intense mixing through a static mixer, and repeating movement in the fractionation chambers 110(*n*), reduce the size of biosolids 50 to fine particles. This process is unique in that it breaks opens the biosolid 50 particles and allows for the release of hydrophobic PFAS compounds that are inside biosolids 50.

Referring to FIG. 22, in one embodiment, hydrodynamic cavitation is used to reduce the size of biosolids 50 particles thereby creating greater overall surface area of biosolids 50. Hydrodynamic cavitation refers to the process of cavitation bubble formation, growth, and collapse in the liquid when the local pressure of the fluid is lower than the saturated vapor pressure.

Referring to FIG. 1-6, once the biosolids 50 have been diluted to about 1% solids and reduced to particles smaller than about 2 mm, a surfactant may be added to aid in the formation of bubbles. Surfactants aid in the formation of bubbles and dosage will vary from product to product. Injection of the surfactant is through the use of a positive displacement rotary lobe pump 360. In one embodiment, the rotary lobe pump 360 is a Vogelsang pump. The surfactant is injected into an injection ring through four injection ports around the pipe 20 for even distribution. Once injected, the combination of biosolids 50 and surfactant is mixed by static mixer 60. The static mixer 60 may be positioned in line with pipe 20 before biosolids 50 are introduced to chambers 110, 115, 120, 125, 130.

Even though some PFAS compounds are hydrophobic, they can remain trapped inside the biosolids 50 unless there is a mechanism to remove PFAS particles from the biosolids 50. Foam Fractionation does that by creating air bubbles in the biosolids 50. The hydrophobic PFAS compounds attach themselves to the bubbles and rise to the top of fractionation chambers 110(*n*), essentially positioned as a layer on top of the biosolids.

A vacuum 160 then removes the PFAS particles and microplastics from first fractionation chamber 110 and delivers them to second fraction chamber 115. Once the foam 350 has been vacuumed off the top of the first chamber 110, the foam 350 goes through a demister 80 which substantially breaks the bubbles and converts them into water and concentrated PFAS. The velocity slowing chamber 70 retards the speed of air/foam that is recovered from fractionation chambers 110(*n*) and bursts the bubbles in the foam, thereby concentrating the foam before vacuum 240 removes the foam from fractionation chambers 110(*n*). The velocity slowing chamber 70 slows the velocity of biosolids 50 to less than about 30 ft/min. A demisting pad 80 eliminates liquid vapors and pass through a dryer air supply to the vacuum side of the blower. Demisting pads 80 are made in various sizes and shapes and are commonly available.

This concentrate accumulates in second fractionation chamber 115 and the process described above in the context of the first fractionation chamber 110 repeats. This process is then repeated so that foam 350 containing PFAS is vacuumed from second fractionation chamber 115 and delivered to third fractionation chamber 120. The process may be repeated as desired to remove PFAS. In one embodiment, the process uses five fractionation chambers 110(*n*). At each fractionation chamber 110(*n*), the concentration of PFAS in foam 350 increases. As the number of cycles of FF increases, the more concentrated the foam 350 becomes, thereby reducing the resulting volume of foam 350 to be discarded.

Some biosolids 50 may not have the requirement for adding surfactant 355, however in most applications, a higher PFAS and microplastics removal rate is achieved when surfactants are added. Various commercially available options exist for surfactants. One skilled in the trade will be able to try different types for the best performance. In one embodiment, Decyl Glucoside or Nonylphenol Ethoxylated are used to help aid in the formation of bubbles. However, many different types of surfactants can be used.

The success of PFAS and microplastic removal depends on various factors. One of which is the amount of time that the biosolids 50 remain in fractionation chambers 110(*n*). The longer the fractionation process continues, the greater the amount of PFAS is removed from biosolids 50 and encapsulated in foam 350. In one embodiment, biosolids remain in fractionation chambers 110(*n*) for about 20 minutes. This invention deploys weirs 170(*a-n*) within chambers 110, 115, 120, 125, 130 to permit a full 20 minute treatment process and protects against short circuiting. The weirs 170(*n*) force the material to flow around the weirs 170(*n*) and not flow in a straight line from entry to exit. This increases the dwell time in the chambers 110(*n*) to make sure the material remains in chambers 110(*n*) about 20 minutes. Otherwise, material could come in and go straight to the outlet in a few minutes and not have enough time for adequate treatment. In one embodiment, FF for more than 20 minutes has diminished benefits and cost effectiveness.

Once the biosolids 50 have been processed through fractionation chambers 110(*n*) the system 10 transports biosolids 50 to a dewatering device 250 to reduce volume by removing water before disposal. In one embodiment, the dewatering device 250 is a centrifuge or belt press. In another embodiment, the dewatering device is a mechanical press device as described in published application US 2023/0174403 A1, which is incorporated herein by reference in its entirety. After dewatering, the biosolids 50 can be processed through a Double Drum Drying process as described in published application US 2022/0315500 A1, which is incorporated herein by reference in its entirety. In this combination, wastewater treatment plant generators would not need to have any digesters potentially saving millions of dollars in capital and operating costs.

During each subsequent stage of foam fractionation processing, any liquid that is not removed as foam is returned to the stage one foam fractionation chamber 110 for further processing to achieve acceptable levels of PFAS.

Once complete, the PFAS and microplastics containing foam 350 may be disposed. Volume reduction ranges for each fractionation stage is 10-30%. The concentrate will contain PFAS and microplastics removed from biosolids.

A unique part of this invention is the development of combining pressure transducers 430 at the bottom of fractionation chambers 110(*n*). The pressure transducers 430 identify volume of biosolids 50 in fractionation chambers 110(*n*). In one embodiment, the volume of biosolids is determined by measuring the height of biosolids 50 relative to the height of fractionation chambers 110(*n*). Through the PLC 100, the transducers 430 transmit a signal to the electronic drain valves 420 at the bottom of fractionation chambers 110(*n*). The drain valves 420 are opened and closed according to the volume of biosolids 50 in the chambers 110, 115, 120, 125, 130 to ensure the tanks continuously remain full of biosolids. This mechanism also allows the operator to control the height of the foam 350 in the vacuum hood 180.

The control signal is then communicated to the original biosolids pump 35 that pumps biosolids 50 to the first stage chamber 110. Depending on the volume of biosolids in fractionation chambers 110(*n*), the biosolids pump 35 is automatically adjusted to maintain the desired volume of biosolids 50 in fractionation chambers 110(*n*). The continuous monitoring of biosolids 50 volume in fractionation chambers 110(*n*) allows the foam fractionation method and system to run continuously and autonomously.

When the PFAS concentrated foam 350 is removed from fractionation chambers 110(*n*), it may be optionally processed through a supercritical water oxidation process (i.e., SCWO) SCWO uses high pressure and high temperature to oxidize substantially all organics and PFAS compounds with up to a 99% removal rate. Alternately, other disposal methods may be used depending on operator preference and available technologies in the area. Alternatively, the PFAS concentrated foam 350 may be dried to reduce the volume to be disposed.

Applying the system and methods as described can result in one plant that produces 200,000 gallons of biosolids per day could reduce that volume to less than 10-200 gallons of highly concentrated PFAS and microplastics for disposal.

The invention claimed is:

1. A system for reducing particles in biosolids, comprising:

a storage tank for holding biosolids and an inlet pipe, wherein the inlet pipe delivers biosolids from the storage tank to a screener and then to a percent solids meter operably connected to the inlet pipe, wherein the percent solids meter measures the solid content in the biosolids and sends a signal to an electronic solenoid valve to control water content of the biosolids introduced to the system;

a first venturi hydrodynamic cavitation chamber operably connected to a chlorine generator, wherein the biosolids are conveyed through the inlet pipe to the first venturi hydrodynamic cavitation chamber and the first venturi hydrodynamic cavitation chamber creates vacuum bubbles in the biosolids;

a first mechanical hydrodynamic cavitation device operably connected to the first venturi hydrodynamic cavitation chamber to receive biosolids through the inlet pipe from the first venturi hydrodynamic cavitation chamber, wherein the mechanical hydrodynamic cavitation device creates vacuum bubbles in the biosolids; and a dewatering device operably connected to the mechanical hydrodynamic cavitation device to receive the biosolids and to remove water from the biosolids.

2. The system of claim 1, further comprising a plurality of venturi hydrodynamic cavitation chambers arranged in series downstream of the first venturi hydrodynamic cavitation chamber, wherein each of the plurality of venturi hydrodynamic cavitation chambers disrupts biosolids to reduce a volume of particles present in the biosolids.

3. The system of claim 2, wherein the particles include polyfluoroalkyl substances (PFAS) and microplastics.

4. The system of claim 3, wherein a plurality of disc diffusers comprise a slit disc diffuser recessed into the bottom floor of the at least one foam fractionation chamber.

5. The system of claim 3, further comprising a positive displacement pump to introduce a surfactant to the biosolids to aid in the formation of air bubbles.

6. The system of claim 1, further comprising:

at least one foam fractionation chamber operably connected to the first mechanical hydrodynamic cavitation device to receive biosolids after biosolids pass through the first venturi hydrodynamic cavitation chamber and the first mechanical hydrodynamic cavitation device, wherein the at least one foam fractionation chamber has a top portion and a bottom floor, a plurality of weirs positioned inside the at least one foam fractionation chamber, wherein the weirs act as baffles to direct and control the rate and directional flow of the biosolids;

a plurality of automated drain valves positioned in the bottom floor of the at least one foam fractionation chamber, wherein the plurality of automated drain valves is operable to remove biosolids from the at least one foam fractionation chamber in response to a signal received from a programmable logic control;

at least one positive displacement blower, wherein the at least one positive displacement blower delivers a plurality of air bubbles into biosolids in the at least one foam fractionation chamber;

a plurality of disc diffusers positioned substantially flush with the bottom floor of the at least one foam fractionation chamber, wherein the plurality of disc diffusers agitate biosolids to prevent the accumulation of biosolids on the bottom floor.

7. The system of claim 6, wherein the at least one foam fractionation chamber includes a vacuum hood.

8. The system of claim 6, further comprising a velocity slowing chamber to reduce the rate of removal of foam from the at least one foam fractionation chamber and to burst the air bubbles to concentrate the foam before a vacuum removes the foam from the at least one foam fractionation chamber.

9. The system of claim 1, wherein the dewatering device is selected from the group comprising a centrifuge, a belt press, a mechanical press and a screw press.

10. The system of claim 1 wherein the dewatering device comprises a double drum drying system.

11. The system of claim 1, further comprising a continuous flow self-cleaning screen, wherein the continuous flow self-cleaning screen removes solid particles from the biosolids.

12. The system of claim 1, further comprising a surfactant injection unit.

13. The system of claim 1, further comprising a vacuum system having a demister and velocity slowing chamber to extract foam.

14. A continuous operating system for reducing particles from biosolids, comprising:

an inlet pipe, wherein the inlet pipe delivers biosolids from a storage tank to a screener and then to a percent solids meter operably connected to the inlet pipe, wherein the percent solids meter measures the solid content in the biosolids and sends a signal to an electronic solenoid valve to control water content of the biosolids introduced to the system;

a chlorine generator operably connected to the percent solids meter, wherein the biosolids are conveyed through the inlet pipe to the chlorine generator from the percent solids meter;

a first venturi hydrodynamic cavitation chamber operably connected to the chlorine generator, wherein the biosolids are conveyed through the inlet pipe to the first venturi hydrodynamic cavitation chamber from the chlorine generator and the first venturi hydrodynamic cavitation chamber creates vacuum bubbles in the biosolids.

15. The system of claim 14 further comprising a mechanical hydrodynamic cavitation device operably connected to the first venturi hydrodynamic cavitation chamber, wherein the mechanical hydrodynamic cavitation device creates vacuum bubbles in the biosolids.

16. The system of claim 14, further comprising a static mixer operably connected to the inlet pipe to allow the addition of a surfactant to the biosolids.

* * * * *